United States Patent
Lafrance

(10) Patent No.: US 10,832,206 B2
(45) Date of Patent: Nov. 10, 2020

(54) SYSTEM AND METHOD FOR MANAGING AND OPTIMIZING DELIVERY NETWORKS

(71) Applicant: 9316-2832 Quebec Inc., Brossard (CA)

(72) Inventor: Christian Lafrance, Montreal (CA)

(73) Assignee: Clear Destination Inc., Montreal (CA)

( * ) Notice: Subject to any disclaimer, the term of this patent is extended or adjusted under 35 U.S.C. 154(b) by 499 days.

(21) Appl. No.: 15/000,899

(22) Filed: Jan. 19, 2016

(65) Prior Publication Data
US 2016/0210591 A1 Jul. 21, 2016

Related U.S. Application Data

(60) Provisional application No. 62/105,074, filed on Jan. 19, 2015.

(51) Int. Cl.
*G06Q 10/08* (2012.01)
*G06F 16/29* (2019.01)
*G06Q 10/04* (2012.01)

(52) U.S. Cl.
CPC ....... *G06Q 10/08355* (2013.01); *G06F 16/29* (2019.01); *G06Q 10/047* (2013.01)

(58) Field of Classification Search
CPC ............ G06Q 10/08355; G06Q 10/047; G06F 17/30241; G06F 16/29
See application file for complete search history.

(56) References Cited

U.S. PATENT DOCUMENTS

| 6,701,299 B2 | 3/2004 | Kraisser et al. |
| 8,793,194 B2 | 7/2014 | Lee |

(Continued)

FOREIGN PATENT DOCUMENTS

| JP | 2001-319160 A | 11/2001 |
| JP | 2001319160 A | 11/2001 |

(Continued)

OTHER PUBLICATIONS

Mohammad Abousaiedi, Geographic Information System (GIS) modeling approach to determine the fastest delivery routes, Sep. 2016, pp. 555-564 Fig. 3, Saudi Journal of Biological Sciences (Year: 2016).*

(Continued)

*Primary Examiner* — Rupangini Singh
*Assistant Examiner* — Ismail A Manejwala
(74) *Attorney, Agent, or Firm* — Brett J. Slaney; CPST Intellectual Property Inc.

(57) ABSTRACT

A system and method are provided for managing and optimizing delivery networks. The method includes providing an intermediary between a consumer and a plurality of carriers, each carrier enabling items to be transported from pick up locations for the items to a delivery location associated with the consumer. The method also includes enabling, via a user interface for the intermediary, the consumer to request delivery of an order comprising one or more items to the delivery location. The method also includes communicating with the plurality of carriers to determine at least one available delivery time window according to carrier availability and a transit time for the requested delivery, the transit time being affected by inventory data and the delivery location. The method also includes initiating the delivery by a selected one of the plurality of carriers.

24 Claims, 34 Drawing Sheets

(56) References Cited

U.S. PATENT DOCUMENTS

| | | | |
|---|---|---|---|
| 8,799,178 B2 | 8/2014 | Lavoie et al. | |
| 2001/0034673 A1* | 10/2001 | Yang | G06Q 10/06311 705/28 |
| 2002/0022983 A1 | 2/2002 | Barton | |
| 2003/0084125 A1* | 5/2003 | Nagda | G06Q 10/08 709/219 |
| 2003/0115104 A1 | 6/2003 | Smith et al. | |
| 2006/0136236 A1* | 6/2006 | Horton | G06Q 10/08 705/330 |
| 2006/0291396 A1* | 12/2006 | Hamilton | G01C 21/3461 370/238 |
| 2007/0083410 A1 | 4/2007 | Hanna | |
| 2007/0150375 A1* | 6/2007 | Yang | G06Q 10/08 705/339 |
| 2008/0162304 A1* | 7/2008 | Ourega | G06Q 10/08 705/26.4 |
| 2008/0167817 A1* | 7/2008 | Hessler | G01C 21/005 701/514 |
| 2009/0144109 A1* | 6/2009 | Knight | G06Q 10/08 705/334 |
| 2009/0230190 A1* | 9/2009 | Chanez | G06Q 10/08 235/385 |
| 2012/0036072 A1 | 2/2012 | Riggs et al. | |
| 2013/0138574 A1 | 5/2013 | McCall et al. | |
| 2014/0149313 A1 | 5/2014 | Laurent et al. | |
| 2014/0230374 A1 | 8/2014 | Tian et al. | |
| 2014/0297553 A1 | 10/2014 | Benda et al. | |
| 2015/0120600 A1 | 4/2015 | Luwang et al. | |

FOREIGN PATENT DOCUMENTS

| | | |
|---|---|---|
| JP | 2002-032446 A | 1/2002 |
| JP | 2002-342876 A | 11/2002 |
| JP | 2005-092790 A | 4/2005 |
| JP | 2005092790 A | 4/2005 |
| JP | 2006-321647 A | 11/2006 |
| JP | 2007-008671 A | 1/2007 |
| JP | 2008-524704 A | 7/2008 |
| JP | 2008524704 A | 7/2008 |
| JP | 2009-046242 A | 3/2009 |
| JP | 2013-531856 A | 8/2013 |
| JP | 2013-211007 A | 10/2013 |
| WO | 2006065551 A2 | 12/2005 |
| WO | 2012/006031 A1 | 1/2012 |
| WO | WO 2012/0167174 A1 | 12/2012 |
| WO | 2013/0143856 A1 | 10/2013 |

OTHER PUBLICATIONS

Ott, M.; International Search Report from corresponding PCT Application No. PCT/CA2016/050042; search completed Apr. 15, 2016.

JDA eight; http://www.jda.com/solutions/jda-eight/; JDA Software; online at least as early as Oct. 24, 2014.

Retailer Overview; http://www.dropship.com/platform-features; Dropship Commerce; online at least as early as Oct. 24, 2014.

Order, Inventory & Product Management | SalesWarp is Omni Channel eCommerce Management; https://www.saleswarp.com/products/spark-ecommerce-software/; SalesWarp; online at least as early as Oct. 24, 2014.

Descartes Unveils Same-Day Delivery Optimization Technology; lhttps://www.descartes.com/news-events/general-news/descartes-unveils-same-day-delivery-optimization-technology; Descartes; Nov. 13, 2013.

Next Generation of Home Delivery: Real-Time Optimization Technology offers more choices customers at point-of-sale; https://www.descartes.com/knowledge-center/next-generation-home-delivery-real-time-optimization-technology-offers-more-choices; Descartes; online at least as early as Oct. 24, 2014.

White Paper—Logistics Flow Control: Gaining Command of the Inbound Supply Chain; https://www.descartes.com/documents/white-paper-logistics-flow-control-gaining-command-inbound-supply-chain; Descartes; online at least as early as Oct. 24, 2014.

Fleet Route Planning Software; http://www.omnitracs.com/solutions/planning-delivery?referrer=roadnet.com; Omnitracs; online at least as early as Oct. 24, 2014.

Grand Junction—Local Delivery Reinvented; http://www.grandjunctioninc.com/enterprise/ ; Grand Junction; online at least as early as Oct. 24, 2014.

Cardinal Hosted Logistics | Customer Portal; http://www.cardinalhostedlogistics.com/solutions/customer-portal; Cardinal; online at least as early as Oct. 24, 2014.

Roach Partridge, Amy; The Last Miles's Lasting Impact; http://www.inboundlogistics.com/cms/article/the-last-miles-lasting-impact/; Mar. 2011.

Gonzalez, Adrian; The Most Critical Factor in Last-Mile Delivery: Managing the End-Customer Experience; http://talkinglogistics.com/2014/02/26/critical-factor-last-mile-delivery-managing-end-customer-experience/; Feb. 26, 2014.

Capabilities; http://www.mercurygate.com/3pl-solutions/capabilites/; Mercury Gate; online at least as early as Oct. 24, 2014.

Technology Platform/Ensenda; http://ensenda.com/technology/technology-platform/ ; Ensenda; online at least as early as Oct. 24, 2014.

Brownell, Jim; Integrating Multi-Channel Retail Systems; Inbound Logistics; Dec. 2003.

Office Action dated Sep. 17, 2019 in connection with corresponding Japanese Application No. 2017-538948.

"Movement toward Standardization of GS1 Technology," Distribution and System, No. 157, pp. 25-36, ISSN0286-7362, The Distribution Systems Research Institute, Jan. 30, 2014.

Office Action dated Feb. 6, 2020 from corresponding Chinese Application No. 201680006148.3.

Final Decision of Rejection dated Aug. 4, 2020, issued in corresponding JP Application No. 2017-538948.

\* cited by examiner

SYSTEM AND METHOD FOR MANAGING AND OPTIMIZING DELIVERY NETWORKS

This application claims priority to U.S. Provisional Patent Application No. 62/105,074 filed on Jan. 19, 2015, the contents of which are incorporated herein by reference.

TECHNICAL FIELD

The following relates to systems and methods for managing and optimizing delivery networks.

BACKGROUND

Electronic commerce is becoming increasingly important to the retail industry for reaching wider customer bases and providing more and better options to customers in an competitive marketplace. An issue with electronic commerce can be that for customers to engage the retailer in an online environment, those customers need to feel comfortable with the purchases, particularly for large items where there is limited opportunity to discover the look and feel of the product, other than via photos, reviews from other customers, and web-based comparisons and other data. For smaller items that do not require a large monetary investment, this typically is not a major obstacle to most consumers. However, when large ticket items (e.g. stove, fridge, industrial equipment, etc.) with large price tags are to be delivered to a home or business, there can be a hesitation on the part of the customer, despite the convenience of shopping online and having home or office delivery. This hesitation can be attributed to the uncertainties surrounding reliable deliveries, and variability in delivery date/time windows. (e.g. when provided with relatively large time window such as between 9 am and 6 pm on a given day).

Pickup and delivery schemes are typically developed with static time frames, which can cause resources to be inefficiently used when a single item is picked up at a location (i.e. instead of multiple items). Communication between the delivery network and the customer is often required to coordinate a time frame for picking up or delivering an item, which can also be inefficient and requires an agreement by both parties to ensure there is a person present to receive the item, and the schedules are typically fixed prior to the delivery date with little flexibility, if any.

Large items can be difficult to deliver to a multitude of customers since contact with the customer needs to be made to ensure that they are available for delivery. The physical size and value of the products purchased typically requires customer availability and delivery agents to have a delivery route that accommodates desired delivery windows and location-based constraints imposed on the drivers (e.g., delivery zones, distance between locations, etc.).

Fragmentation of shipping/delivery networks causes a decrease in efficiency and repetition of work performed. The fragmentation of responsibilities leads to highly complex logistics networks that inhibit the efficient delivery of products. For example, it has been found that individual companies are tasked with managing their own systems, which can lead to the ad-hoc development of systems that are not compatible with one another. Moreover, many logistics networks have a multi-layered configuration that prohibits critical communications from being performed.

Customer satisfaction is an important component to retailers, particularly to encourage repeat business. For example, when a customer is satisfied with an initial purchase they may recommend the retailer to other contacts and/or use the same retailer again. The customer's satisfaction of a retailer can be affected by the "last mile" or "final mile" delivery mechanism that is used by that particular retailer. However, in many cases, the last mile delivery step handled by a third-party logistics providers and not the retailer itself. Thus the retailer may have little to no control over a critical element of the delivery process.

Logistics optimization is an important factor in increasing the efficiency of a delivery network. When shipping fleets have little to no communication between themselves, repetition of work can often be performed. For example, shipping items from a retailer to a warehouse and then to a customer, including any number of other intermediary steps, can introduce inefficiencies.

SUMMARY

In one aspect, there is provided a method for managing and optimizing delivery networks, the method comprising: providing an intermediary between a consumer and a plurality of carriers, each carrier enabling items to be transported from pick up locations for the items to a delivery location associated with the consumer; enabling, via a user interface for the intermediary, the consumer to request delivery of an order comprising one or more items to the delivery location; communicating with the plurality of carriers to determine at least one available delivery time window according to carrier availability and a transit time for the requested delivery, the transit time being affected by inventory data and the delivery location; and initiating the delivery by a selected one of the plurality of carriers.

In an implementation, the method further comprises scheduling a delivery appointment and communicating the delivery appointment to at least one of the carrier and the consumer. In another implementation, the delivery can be initiated by detecting a selection of a particular available delivery time window by the consumer, and communicating with the corresponding carrier. The selection can be made at a retail location, or using a personal device. In another implementation of the method, the intermediary can be utilized via a retailer interface.

In another aspect, there is provided a computer readable medium comprising computer executable instructions for managing and optimizing delivery networks, the computer executable instructions comprising instructions for: providing an intermediary between a consumer and a plurality of carriers, each carrier enabling items to be transported from pick up locations for the items to a delivery location associated with the consumer; enabling, via a user interface for the intermediary, the consumer to request delivery of an order comprising one or more items to the delivery location; communicating with the plurality of carriers to determine at least one available delivery time window according to carrier availability and a transit time for the requested delivery, the transit time being affected by inventory data and the delivery location; and initiating the delivery by a selected one of the plurality of carriers.

In yet another aspect, there is provided an intermediary system for managing and optimizing delivery networks, the system comprising a process and memory, the memory comprising computer executable instructions for: providing an intermediary between a consumer and a plurality of carriers, each carrier enabling items to be transported from pick up locations for the items to a delivery location associated with the consumer; enabling, via a user interface for the intermediary, the consumer to request delivery of an order comprising one or more items to the delivery location;

communicating with the plurality of carriers to determine at least one available delivery time window according to carrier availability and a transit time for the requested delivery, the transit time being affected by inventory data and the delivery location; and initiating the delivery by a selected one of the plurality of carriers.

BRIEF DESCRIPTION OF THE DRAWINGS

FIG. 28 illustrates an example interface for call status reporting;

FIG. 29 illustrates an example interface for daily impact reporting;

FIG. 30 illustrates an example interface for damage reporting;

FIG. 31 illustrates an example interface for fleet metric reporting;

FIG. 32 illustrates an example interface for statistics reporting; and

FIG. 33 illustrates an example interface for stop metric reporting.

DETAILED DESCRIPTION

Figure 1:
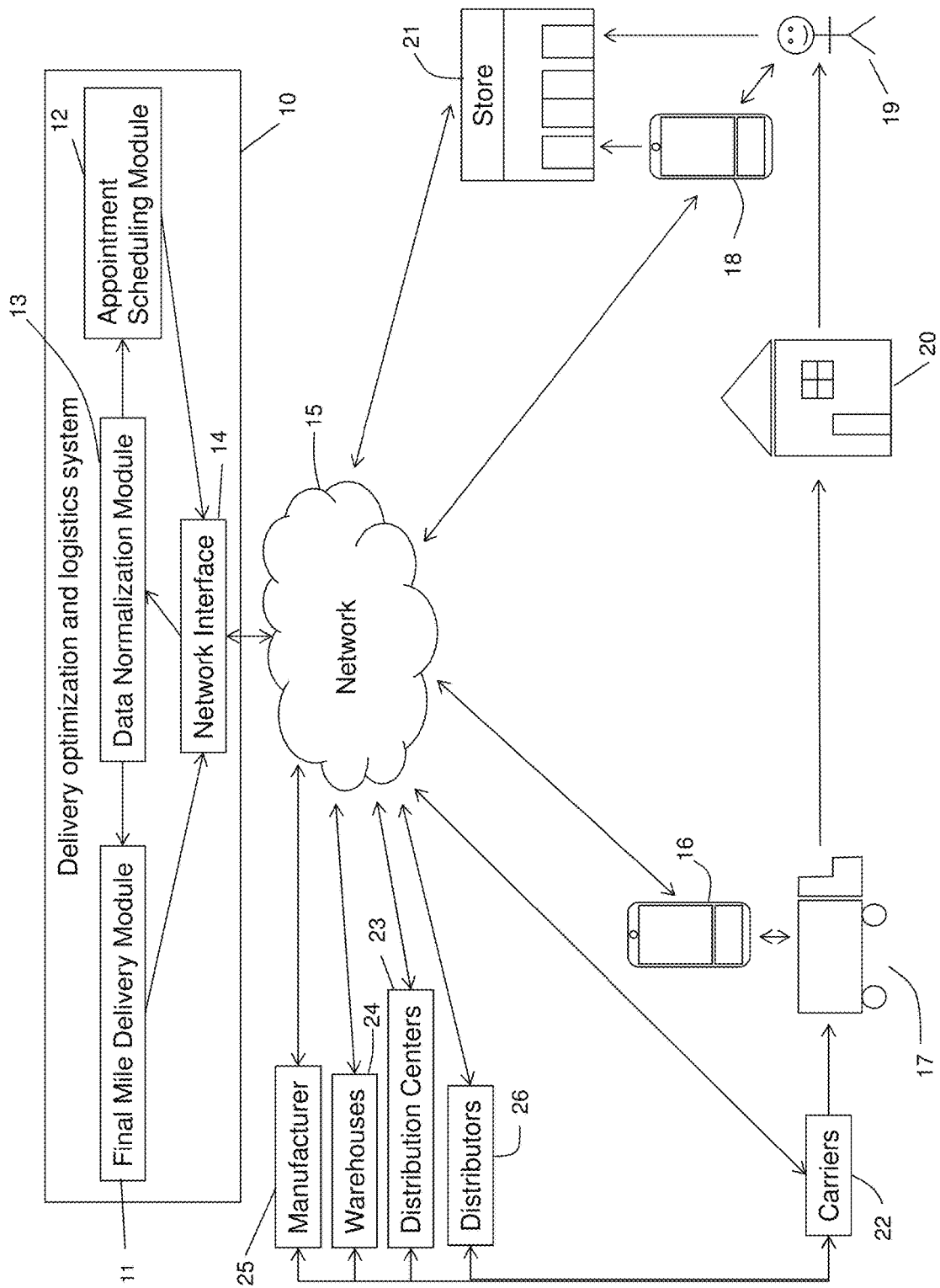
FIG. 1 illustrates a schematic diagram providing a high level overview of the system.

It has been recognized that approximating the time required for transportation and delivery of an item in existing systems is often imprecise. Areas for delivery are considered to be the same from the point of view of routing systems, which causes special cases to be overlooked, and may require broad delivery windows to be provided to the customer. Existing procedures that determine the route required by a delivery entity can be cumbersome and slow to implement, wherein a high degree of approximation in routing and time required for travel and delivery causes a low degree of precision in existing delivery networks.

It has also been recognized that existing methods for calculating the time required for transportation can be superficial thus creating uncertainties. For example, determining the correct route to take based on a variety of factors is a complex issue. The time required for a route is determined by multiplying the distance necessary by the mean speed of a vehicle. Large time frames (e.g. 3 hrs) are appended to forecasted delivery times to compensate for uncertainties and unforeseen events. To date, basic algorithms are typically used to find the shortest route from one point to another. However, these basic algorithms may not take into account any parameters concerning speed adjustments along each route.

Importation and analysis of large amounts of data can be an important element in establishing a delivery network. Traditional methods of importing data may involve the use of a decision matrix, tree, or state machines to reject non-standard data. Rejected data often requires human intervention to correct and/or modify the data. Additional servers are added to an importation system when load levels exceed threshold values. The processing of values can slow all systems that are dependent on the incoming data.

The following provides a system for establishing an interface between members of a logistics network to more efficiently match delivery demand within electronic commerce marketplaces with supply within multiple last mile delivery companies, including small and single owner companies operating small fleets or even one vehicle.

In one aspect, the system described herein provides a web based platform that provides a communication layer interoperable with one or more communication networks to integrate the various parties involved in the logistics network for matching electronic commerce generated demand for delivery services with supply provided by multiple individual delivery companies.

The aforementioned parties involved in the logistics network may include any entity that is involved with the manufacture, transportation, selling, reception, or storage of products or goods. As referred to herein, the last or final mile of delivery is the final portion, segment or "leg" of the delivery process that ultimately provides the ordered/purchased item to the recipient consumer at a desired delivery location (which may or may not be the same as the location of the purchasing consumer).

Moreover, the customer or consumer as herein described refers to any individual or entity (e.g., a person, business, organization, community, manufacturer, etc.) that orders, purchases, commissions, or otherwise seeks to acquire an item from a seller such as a retailer, manufacturer, wholesaler, liquidator, or other entity that is providing the item in exchange for remuneration. Such customers or consumers may include a business, a construction site, a manufacturing plant, a residential home, etc. Customer information is generated when a customer purchases an item from a retailer. The information provided may include item identification, customer availability, purchase verification, or a customer location. Customer data is data that is associated with or attributed to a single customer including without limitation order history, customer location, customer availability (i.e. time of day that the customer is free to receive a delivery), an address, a phone number, an email, and etc.

Herein, a web application is configured to provide a centralized communication link between components of a logistics process. Transparency is established due to the connected nature of the web application. A centralized nature leads to facilitated optimization of logistics by coordinating the retail operations with the delivery operations based on supply and demand within the system as is described in greater detail below. Communication is facilitated through the use of integrated web tools. The network of logistics entities communicates through a web application through communication channels including without limitation telephone, SMS (i.e. short messaging service), email, and instant message.

Figure 14:
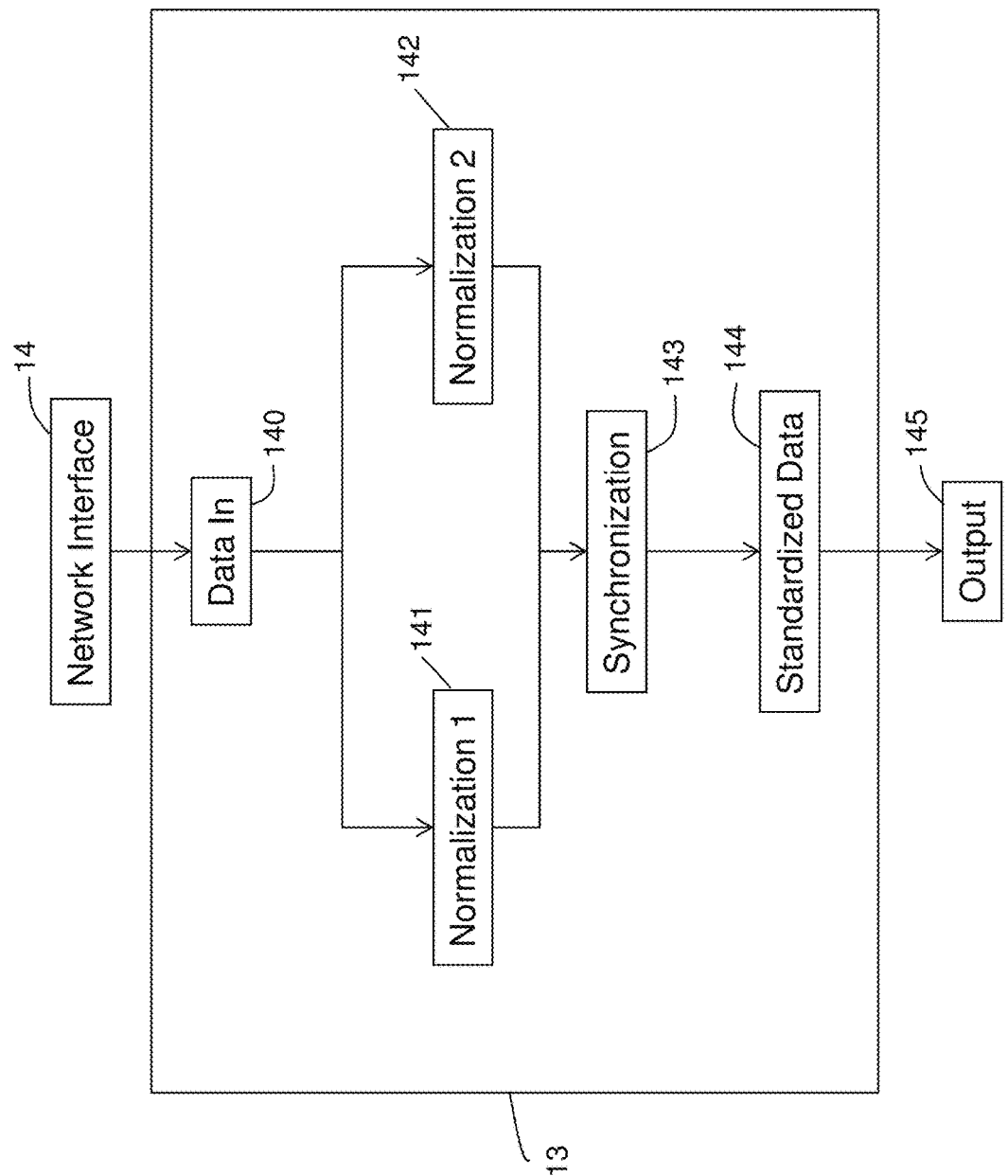
FIG. 14 illustrates computer executable operations performed by a data normalization module.

Referring now to the figures, FIG. 1 illustrates an example of a delivery optimization and logistics system 10, hereinafter referred to as the "system 10". The system 10 includes a final mile delivery module 11, an appointment scheduling module 12, a data normalization module 13 and a network interface 14. The network interface 14, further illustrated below, sends and receives information from one or more networks, hereinafter referred to generally as the "network 15" for brevity. The network interface 14 receives data from the network 15 and transmits the data to the data normalization module 13. An exemplary embodiment of a network 15 is discussed below. The data normalization module 13 processes the data received and configures the information into a standardized format for further processing, as illustrated by FIG. 14. The data normalization module 13 transmits elements of the standardized data to the final mile delivery module 11 and the appointment scheduling module 12. The final mile delivery module 11 generates optimized route data and transmits the data to the network interface 14. The appointment scheduling module 12 generates an appointment schedule and transmits the data to the network interface 14. New data is generated from data configured by the data normalization module 13. The network interface 14 transmits data generated by the final mile delivery module 11 and the appointment scheduling module 12 to the network 15 through the network interface 14.

An example network 15, as illustrated by FIG. 1, is a communication and data transfer system used to link entities to one another. It can be appreciated that a network 15 may be implemented using WLAN, TCP/IP, Bluetooth, WiFi, GSM, CDMA, or a combination of wireless or wired communication protocols. Data may be sent and received between entities that have a valid network interface 14 connected to the network 15. For example the network 15 enables data transfer and information sharing as well as the ability to combine and optimize data from various sources by transferring data to a single system (e.g. system 10). The purpose of the network 15 is to enable communication between the system 10 and connected members of the network 15. A network interface 14 is a component or module that may connect, disconnect or pass information between two components (i.e. system 10 and a network 15). The network interface 14 enables data generated by subsystems to be transferred over a network 15 to other subsystems. The network interface 14 may for example interface with a variety of network 15 types, as previously mentioned.

FIG. 1 further illustrates exemplary entities that transfer data to and from the network 15. A retailer 21 transmits order information and stock levels to the system 10 and receives appointment scheduling data from system 10 through a network 15, as illustrated by FIG. 6. A retailer 21 is any person or entity that sells a product. Appointment schedule data can include a starting time, and an estimated ending time for a particular route. A customer device 18 receives notifications from system 10 through the network 15, illustrated by FIG. 5. A driver device 16 transmits real-time locations, derived from location information (e.g., GPS coordinates) to the system 10 through the network 15 and receives an optimized route to follow from the system 10 through the network 15, illustrated by FIG. 4.

Figure 9:
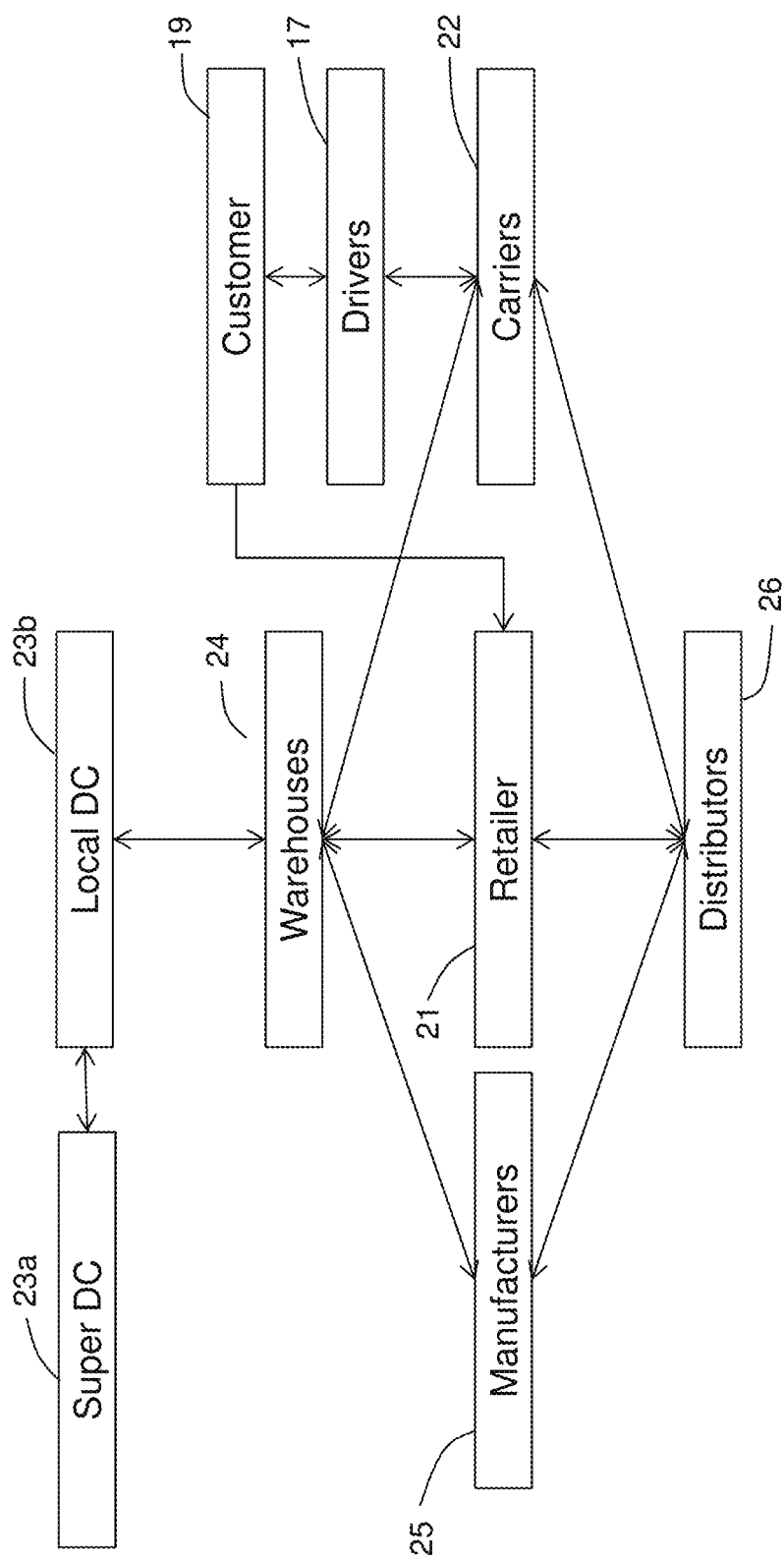
FIG. 9 illustrates an example of a logistics network.

An optimized route is selected to fulfill all requirements of the system 10. A carrier 22 receives scheduling information in addition to receiving the same information as the driver device 16. A manufacturer 25, a warehouse 24 and a distribution center 23, as illustrated by FIG. 9, receive order information and schedule data from system 10 and transmit capacity information and limitations to system 10, through a network 15. Capacity can include the production capabilities of a manufacturer 25, the space available at a warehouse 24 or the number of trucks and drivers available at a carrier 22, limitations imposed by capacities identified.

FIG. 1 also illustrates an example of a physical transportation process. The manufacturer 25 produces an item that is subsequently stored at a warehouse 24. Distribution centers 23 are transportation hubs that facilitate routing items from manufacturers 25, distributors 26, and warehouses 24. Distributors 26 are responsible for providing data about orders to carriers 22 and for ensuring that those carriers 22 get the items to deliver on time. It can be appreciated that a distributor 26 may be a manufacturer 25, a retailer 21, a carrier 22 (or any combination thereof). The system described herein provides tools to distributors 26 to receive and obtain data about their orders, regardless of whether those orders were completed by one or many carriers 22. Carriers 22 transport items in between distribution centers 23, warehouses 24, distributors 26 and manufacturers 25. Carriers 22 are typically associated with multiple drivers 17 (although single driver entities can also benefit from the system described herein). Drivers 17 transport items ordered by the customer 19 from a starting location to a customer location 20. A starting location may include a warehouse 24, a manufacturer 25, a distribution center 23, a customer location 20 or a retailer 21. The customer location 20 is a geographic position corresponding to a customer 19 that ordered an item. The transportation process is illustrated by FIG. 9.

Figure 2:
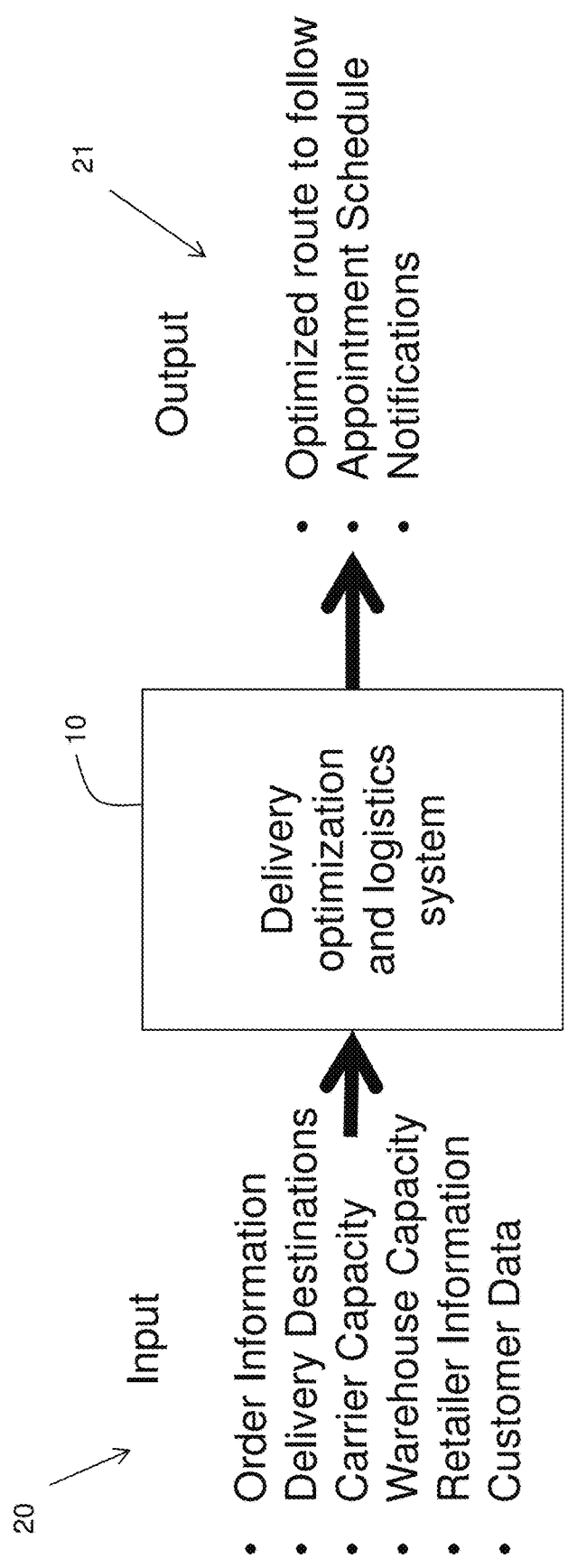
FIG. 2 illustrates information and data flow through the system.

FIG. 2 illustrates an example of information flow through the system 10. The system 10 receives various inputs 20 through the network 15, as illustrated by FIG. 1. The inputs 20 to system 10 may include data pertaining to order information, delivery destinations, carrier capacity, warehouse capacity, and customer data as previously discussed. The system 10 processes the inputs 20 and generates information and data outputs 21 that are used to optimize at least one delivery network. The outputs 21 from system 10 may include an optimized route, an appointment schedule, and customer notifications. The outputs 21 are sent from the system 10 to entities in the network 15, as illustrated by FIG. 1.

Figure 3:
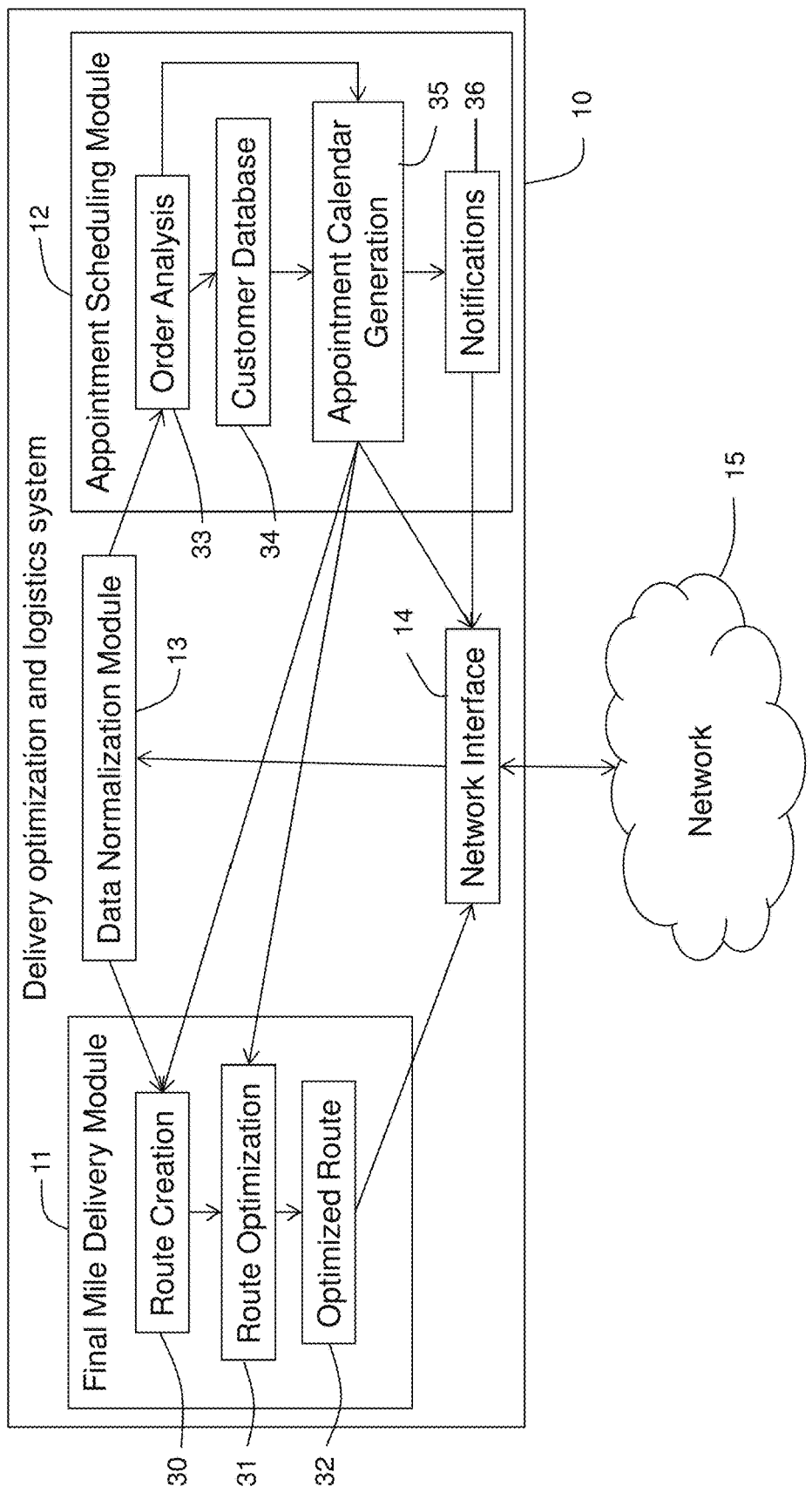
FIG. 3 illustrates an example of a configuration for a delivery optimization and logistics system.

FIG. 3 illustrates an exemplary configuration for the system 10. Data is received from the network 15 by the network interface 14. Data may include data inputs and outputs from system 10, as illustrated by FIG. 2. The network interface 14 transmits the data received to the data normalization module 13. The data normalization module 13 standardizes the data as illustrated by FIG. 14. The data normalization module 13 sends normalized data to an order analysis system 33 contained within the appointment scheduling module 12.

Figure 12:
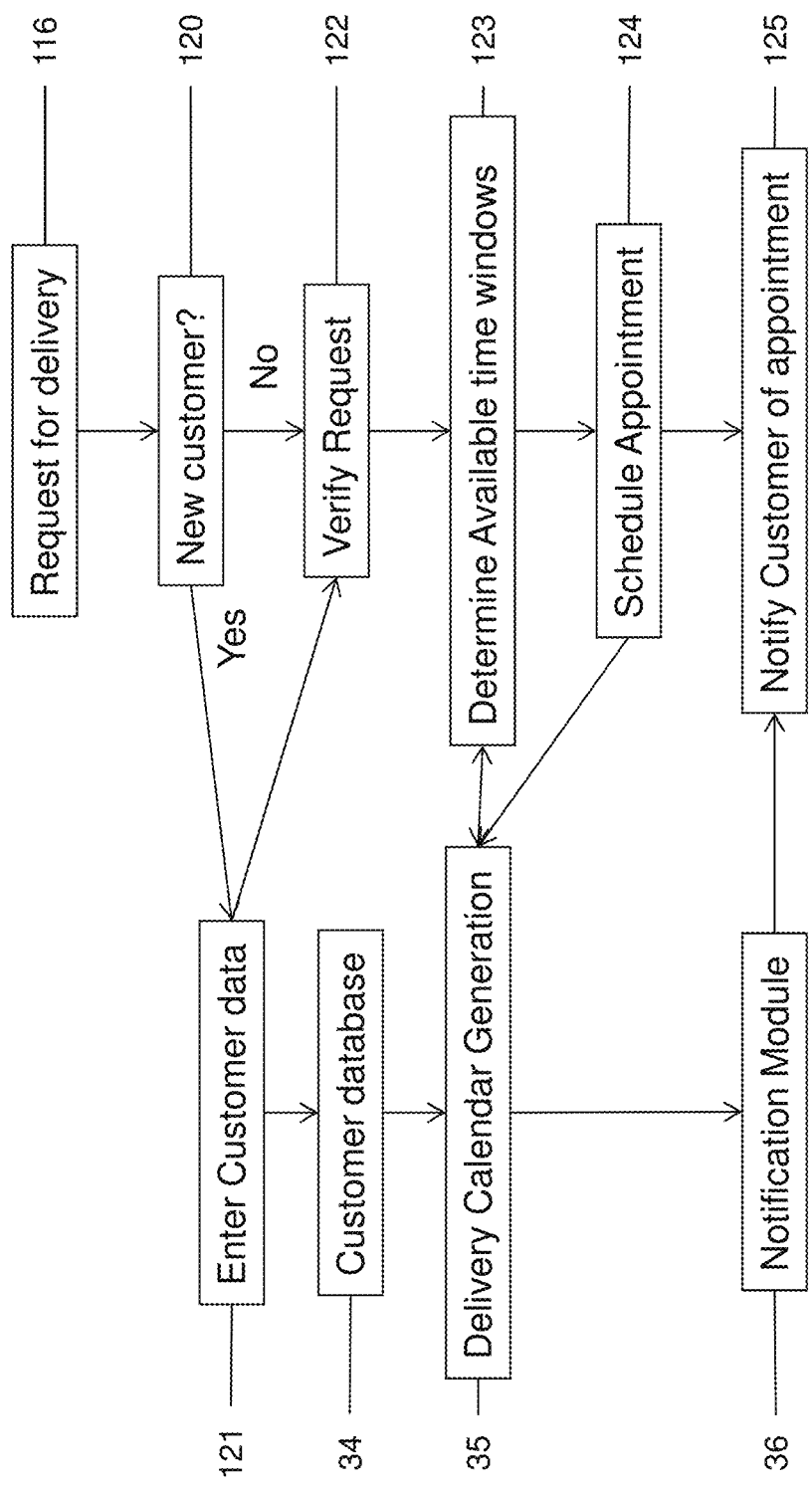
FIG. 12 illustrates computer executable operations performed in scheduling an appointment.
Figure 13:
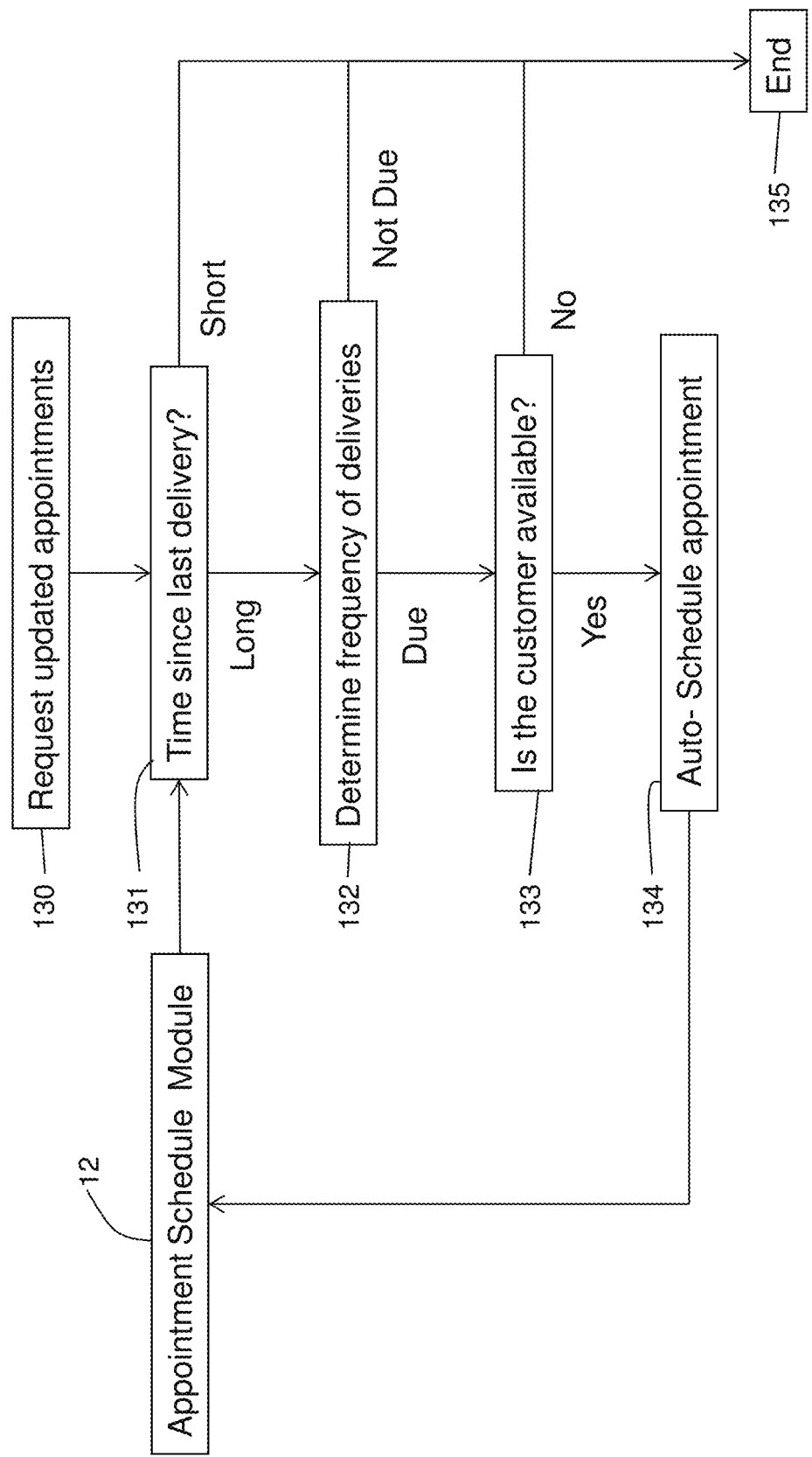
FIG. 13 illustrates computer executable operations performed in automatically scheduling an appointment.

The order analysis system 33 forwards new customer data to a customer database 34 and customer availability to the appointment calendar generation module 35. The customer database 34 is a data collection unit that includes previous orders, customer locations, and other customer data. The customer database 34 provides data to the appointment calendar generation module 35 upon request or at predetermined intervals. The appointment calendar generation module 35 determines, as illustrated by FIG. 12 and FIG. 13, an available time window for delivery and sends the time window to the route optimization system 31, the network interface 14 and the notification system 36.

Figure 15:
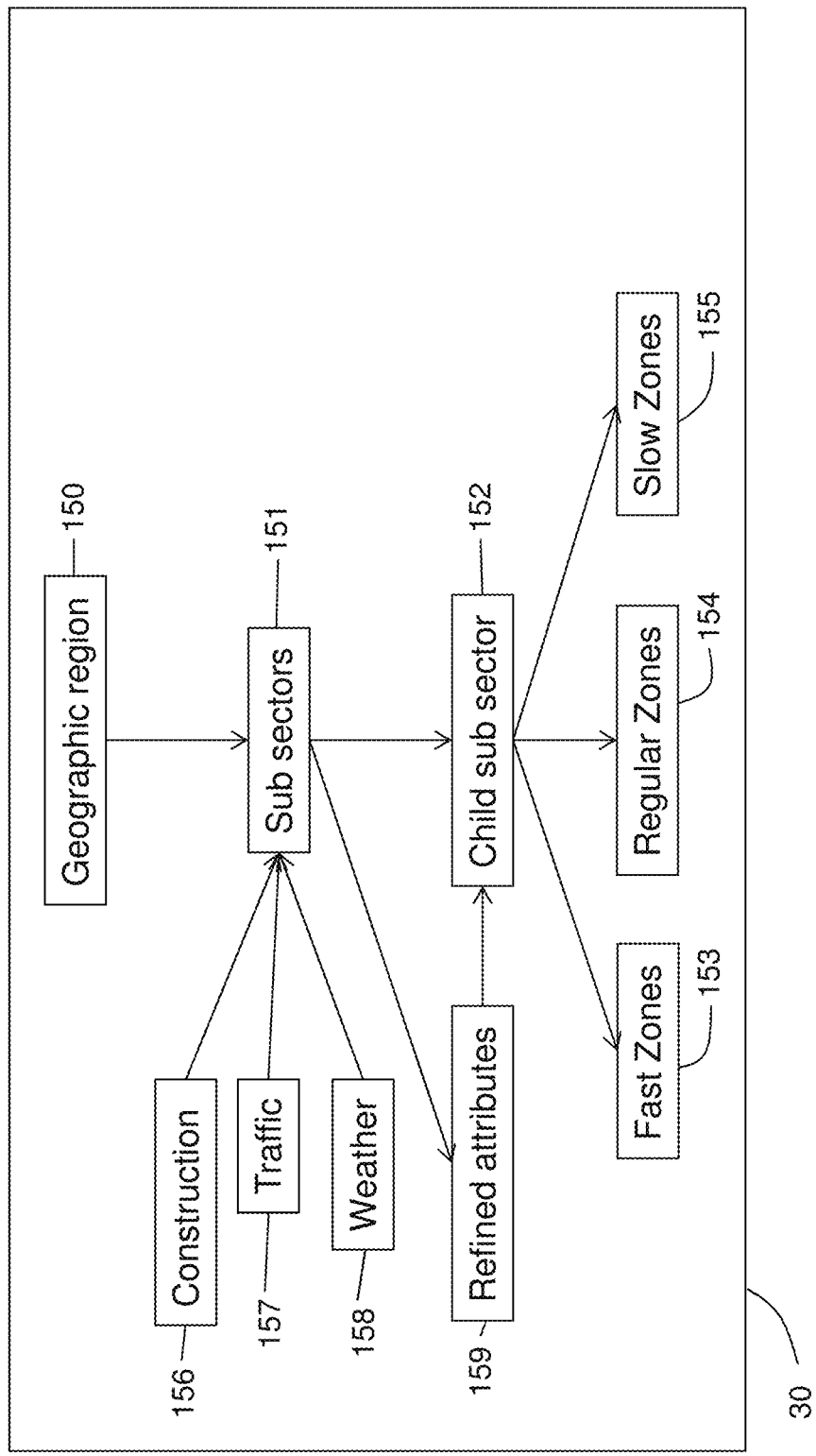
FIG. 15 illustrates computer executable operations performed in associating attributes to physical sectors.
Figure 18:
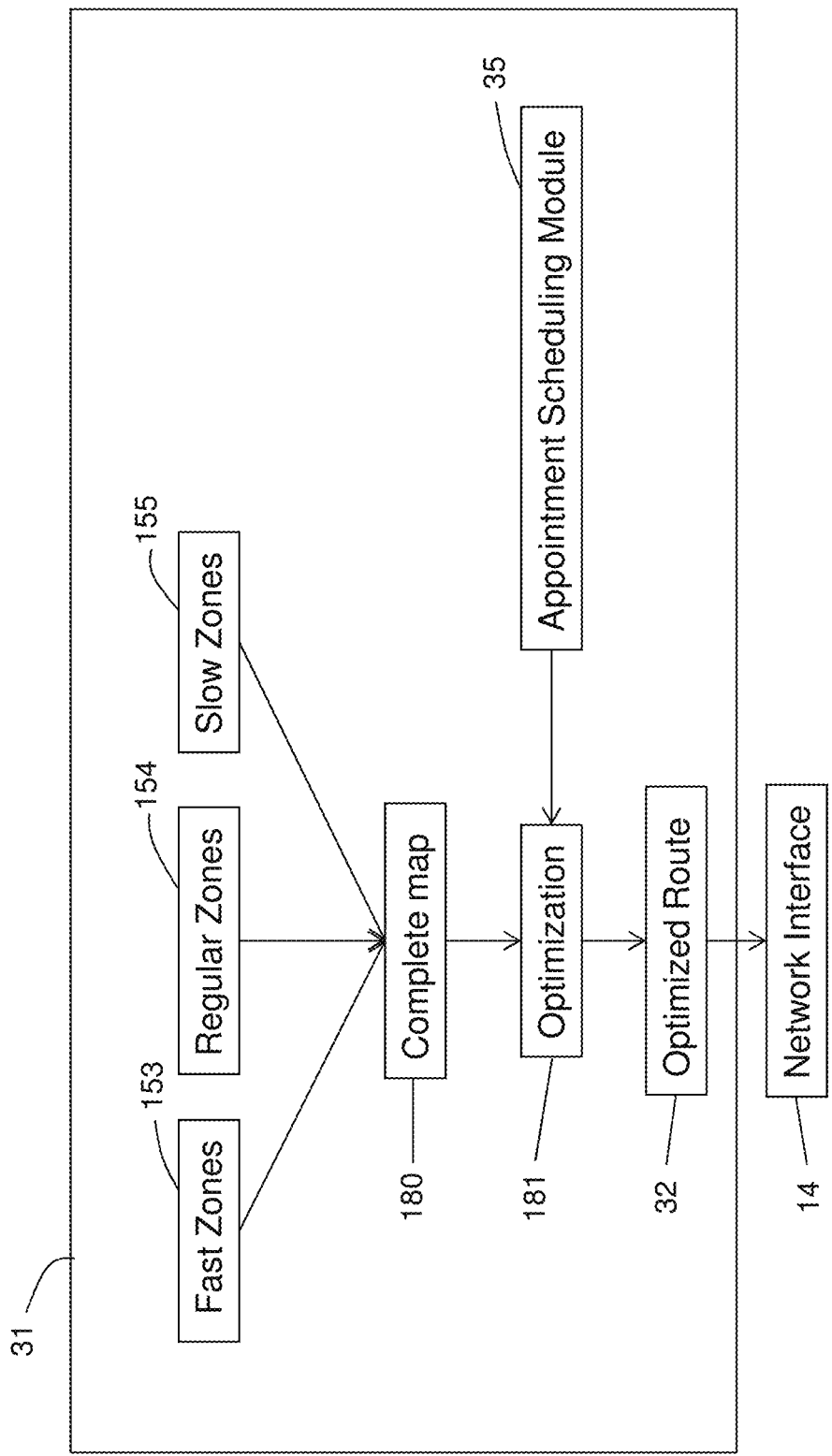
FIG. 18 illustrates an example of a configuration for a road creation and optimization module.
Figure 21:
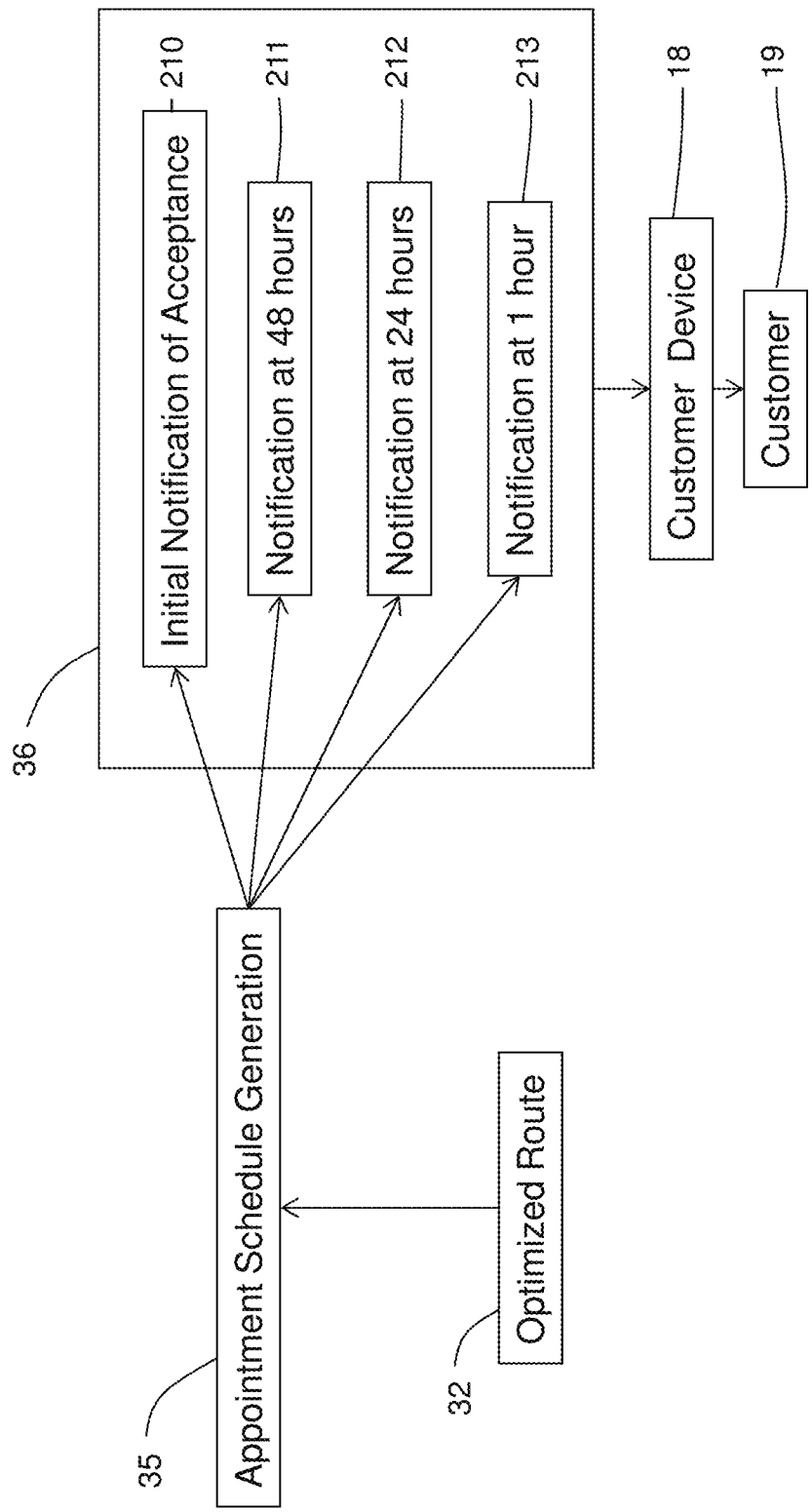
FIG. 21 illustrates computer executable operations performed in a notification process.

The notification system 36 generates a notification at designated times, as illustrated by FIG. 21, and sends the notification to the network interface 14. The final mile delivery module 11 contains a route optimization system 31, and an optimized route module 32. The route creation system 30 may receive a starting location, an ending location and a time window from the data normalization module 13 and appointment calendar system 35. For example a starting location may be a warehouse, a distribution center, or another customer location while the ending location can include a customer location, a distribution center, or a retailer. The route creation system 30 generates a map of routes as illustrated by FIG. 15, and transmits the generated routes to the route optimization system 31. The route optimization system 31 optimizes a route, as illustrated by FIG. 18, and generates a final optimized route 32 to be followed by a driver. The optimized route 32 is sent to the network interface 14 to be transmitted to a driver at a scheduled time.

Figure 4:
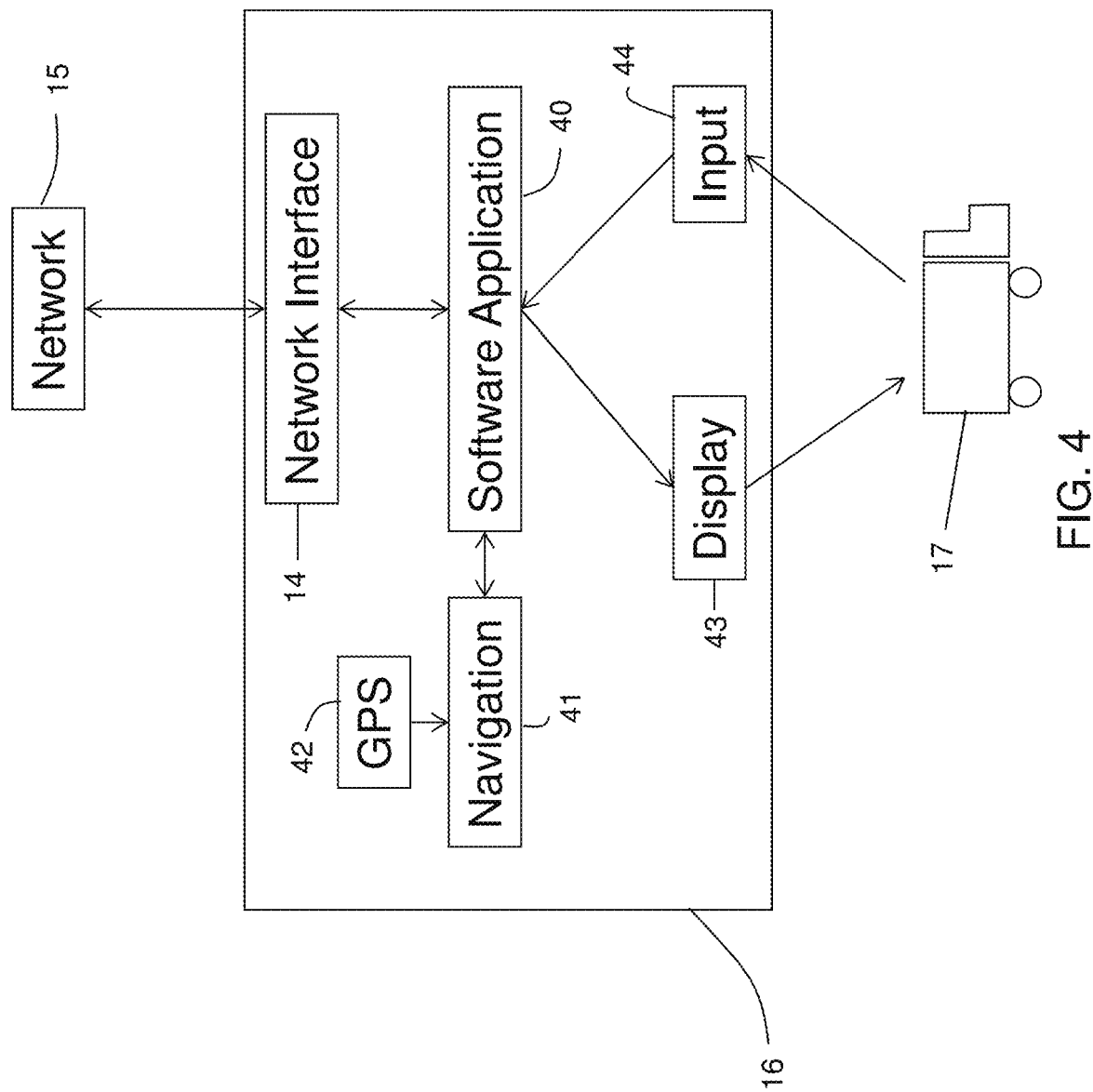
FIG. 4 illustrates an example of a configuration for a driver device.

FIG. 4 illustrates an example of a configuration for a driver device 16. The driver device 16 can include any suitable electronic device, for example a handheld computer, a cell phone, a smart phone, a specialized delivery device, a portable computer or a tablet computer to name a few. The driver device 16 sends and receives data from a network 15 through a network interface 14.

A software application 40 communicates with the network interface 14 to send and receive data to/from the network 15, a navigation system 41 to determine location data such as GPS coordinates, a display 43 to render graphical user interfaces, and an input mechanism 44 to enable a user to interact with the driver device 16. The software application 40 can be configured as any suitable program or set of programs or other computer executable instructions designed to perform operations in a specific application. The software application 40 may be installed directly on the device 16, accessed through a web portal or implemented as a web plugin, etc.

The software application 40 receives optimized routes 32 from the network interface 14 and sends the optimized routes to a navigation system 41 contained within the driver device 16. The navigation system 41 provides the software application 40 with the current geographic location of the driver device 16, through the use of GPS module 42. The software application 40 communicates with the display 43 of the driver device 16 to provide information to the driver 17. The driver 17 may enter data into the input mechanism 44. The input mechanism 44 may acquire data through, for example, a keyboard, touchscreen, track pad, mouse, voice input, touch gestures etc. that interface with the driver device 16. The data that is detected by the driver device 16 is provided by the input component 44 to the software application 40. Data input by the driver 17 can include driver comments, photos, or item data, as further illustrated by FIG. 22 and FIG. 23.

Figure 5:
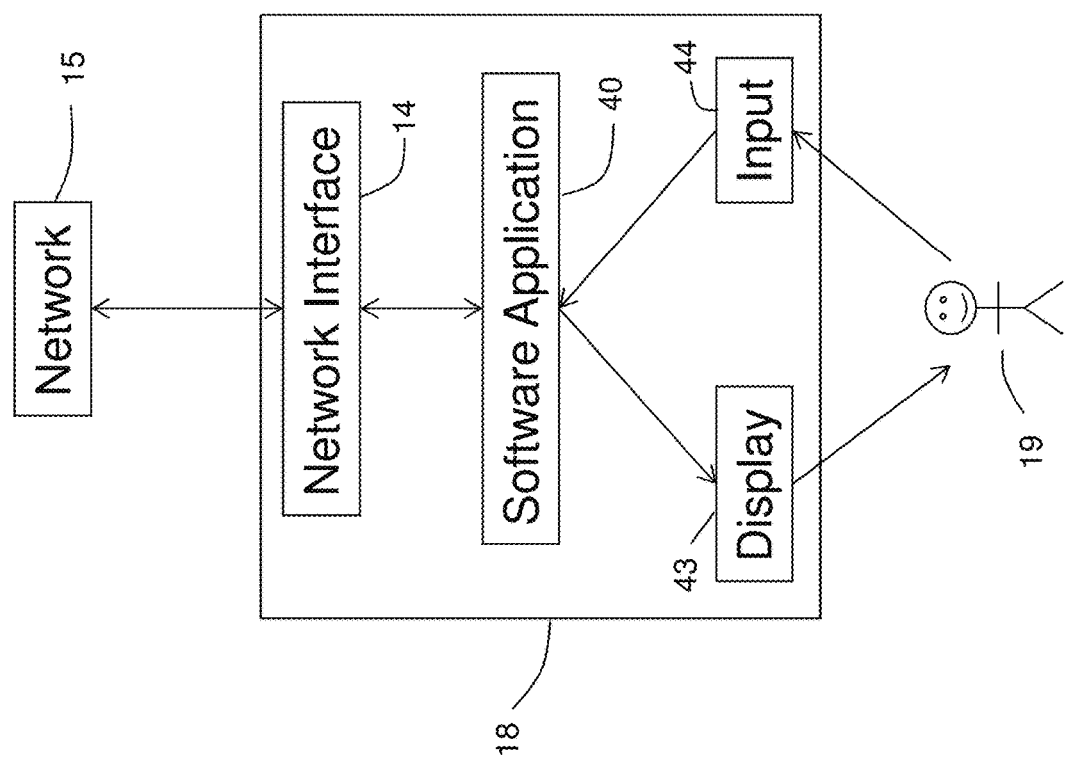
FIG. 5 illustrates an example of a configuration for a customer device.
Figure 6:
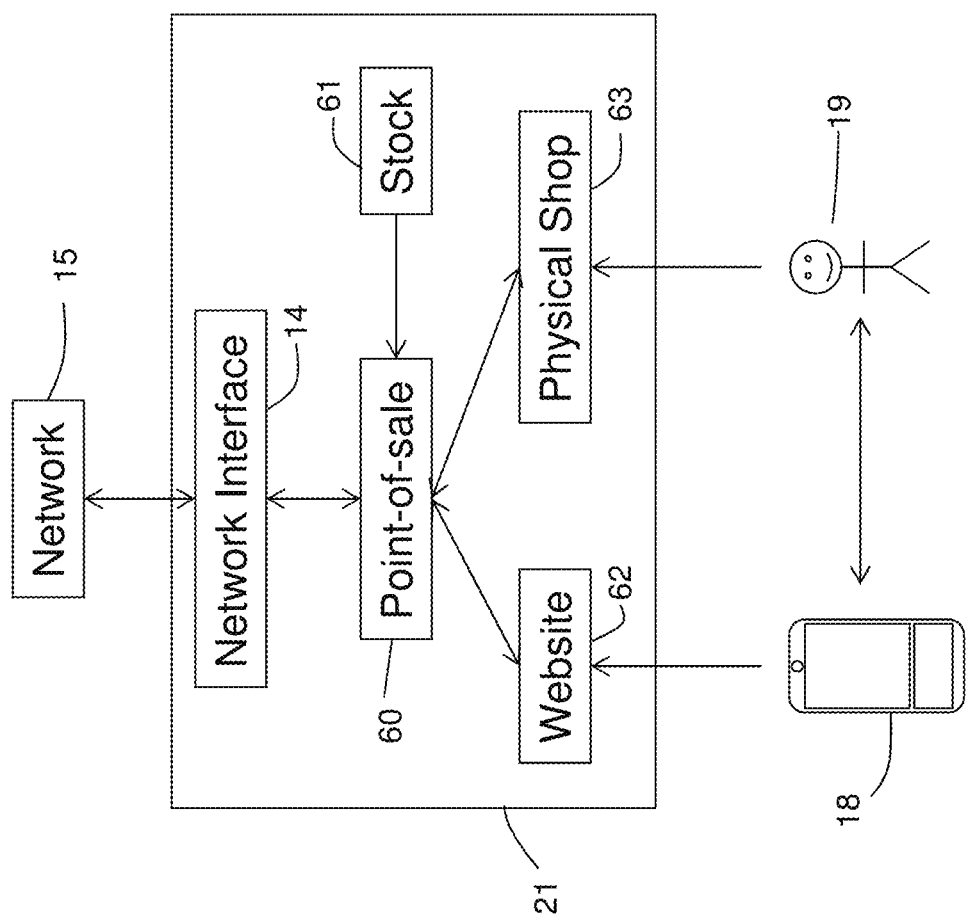
FIG. 6 illustrates an example of a configuration for a retailer infrastructure interacted with by a customer.

FIG. 5 illustrates an example of a configuration for a customer device 18. The customer device 18 may be for example a laptop, a desktop computer, a cell phone, a smart phone, a tablet, a kiosk, etc. The customer device 18, illustrated by FIG. 3, sends and receives data from the network 15 through a network interface 14. A software application 40 communicates with a network interface 14, a display 43 and an input mechanism 44. The software application 40 may be installed directly on the device 16, accessed through a web portal or implemented as a web plugin. A combination of a software application 40, a display 43, and an input mechanism 44 provides the customer 19 with the ability to order items from an electronic retailer, as illustrated by FIG. 6 and FIG. 11. A customer 19 may enter order information to purchase a desired item from a retailer into the input mechanism 44. The order information is provided by the input mechanism 44 to the software application 40. The order information is sent from the software application 40 to the system 10, through the network interface 14 and the network 15. The software application 40 receives notifications from the network 15 through the network interface 14 and sends a notification to the display 43 in order to notify the customer 19.

FIG. 6 illustrates an example of a configuration for retailer device and/or infrastructure 21, hereinafter referred to as "the retailer 21" for ease of reference. The retailer 21 has a point-of-sale system 60 (herein referred to as "POS 60"), a stock management system 61, a website 62 and at least one physical store or "shop" 63 in this example. The POS 60 is a system used by retailers 21 to manage purchases made by customers and generate inquiries to other systems. The stock management system 61 is used to monitor the number of items that a retailer 21 has in its possession or otherwise has access to. The network interface 14 communicates with the existing POS 60 to receive customer data and order information. A network interface 14 transmits order information and customer information to the system 10 through a network 15. The POS 60 receives order information through a website 62 or through a shop 63. The website 62 receives order information and customer data through a customer device 18. The shop 63 receives order information and customer data via inputs provided by the customer 19. The POS 60 verifies customer payments and checks stock 61 available to determine if an external order is required. The stock 61 management may also automatically request for items to be delivered to the retailer (i.e. if stock levels are low place an order to system 10 on behalf of the retailer).

The retailer 21 can integrate with the system 10 in various ways, such as through a generic portal provided by the system 10, or via a customized front end interface developed using, for example, a software development kit (SDK). Such an interface can be provided to an end user via any one or more of the website 62, a terminal in the physical shop 63, the point of sale device 60, or network interface 14. This allows the retailer to provide real-time or substantially-real-time delivery supply information for completing delivery requests and the associated transactions. Similarly, user interfaces can be created for the carriers 22 and customer devices 18. The interface utilized by the retailer 21, as discussed above, can use normalized or standardized data in order to communicate with carriers for the purpose of arranging and executing a delivery. For example, the system 10 and data normalization module 13 can be configured to utilize the GS1 data standard, in order to communicate amongst the various entities described herein using a familiar data format. GS1 is an organization that develops and maintains standards for supply and demand chains, for example to issue bar code numbers for products. GS1 data can also be: i) related to the identification of items, locations, shipments, assets, etc. and the associated data; ii) related to encoding and capturing data in a physical data carrier such as a barcode or RFID tag; and iii) related to sharing data between parties. An example of a process that utilizes such standardized (e.g. GS1) data is described below and shown in FIG. 11B.

Figure 7:
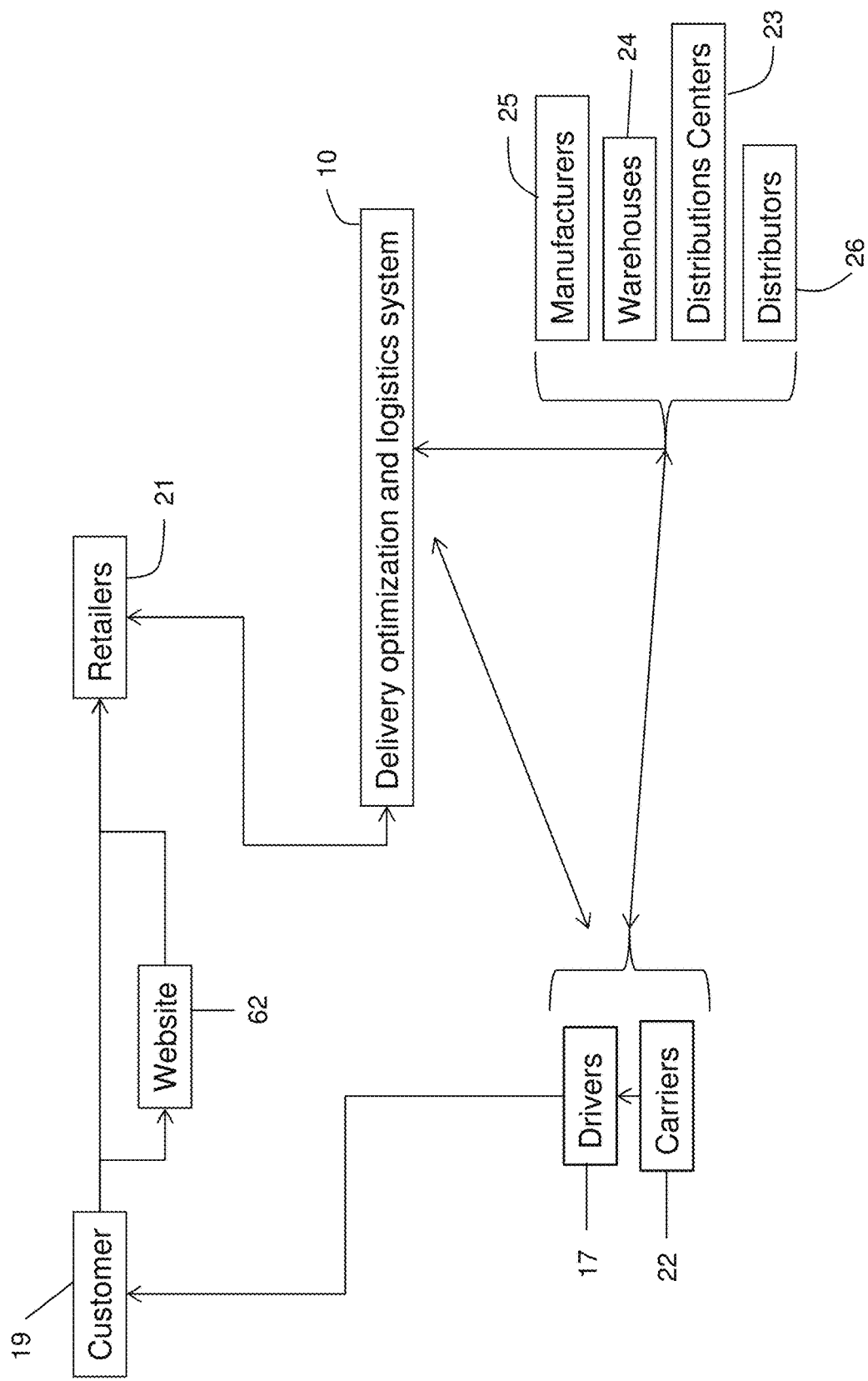
FIG. 7 illustrates an example of a configuration for a ship to home management system.
Figure 23:
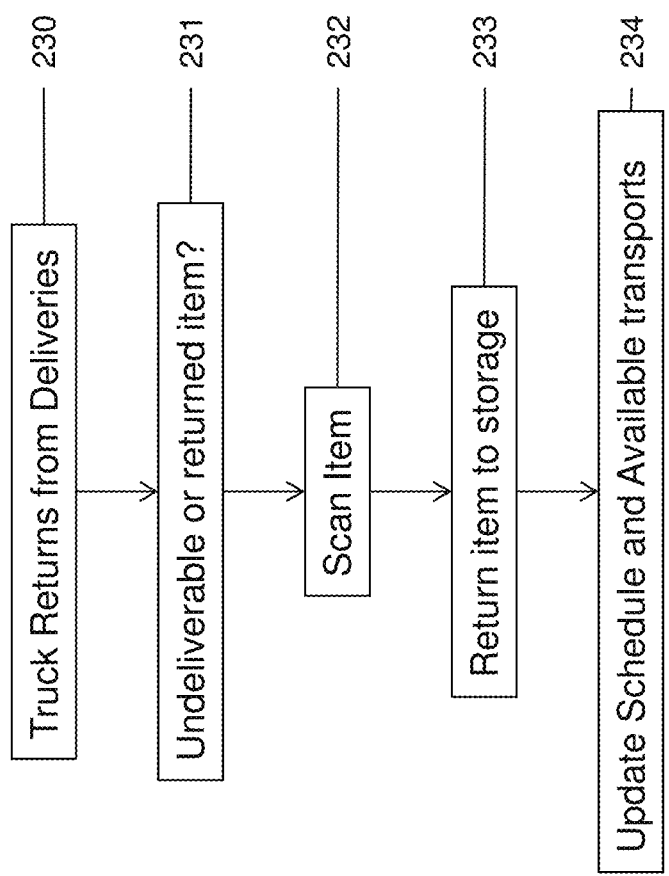
FIG. 23 illustrates computer executable operations performed in processing items at a destination location.

FIG. 7 illustrates an example of a process flow initiated by a customer 19 for arranging delivery of an item. In this example, a customer 19 initiates a purchase either through a web order 62 or directly through a retailer 21, illustrated by FIGS. 11A and 11B. A customer 19 can therefore initiate this process via electronic or physical interfaces with the retailer 21, e.g., via a smart phone app, a website browser, kiosk, etc.; or at a point-of-sale in a physical retailer storefront, e.g., via a shop 63. A retailer 21 receives a customer's order for an item through an existing POS system and initiates an inventory inquiry, e.g., to check the stock associated with the item purchased by the customer 19, illustrated by FIG. 6. The retailer 21 interfaces with the system 10 through a network 15, the system 10 receives order information through a retailer's network interface 14. The system 10 generates a delivery date and time window that correspond to the customer availability provided to the retailer 21 during purchase of an item, further illustration of the appointment scheduling module is provided in FIG. 12. The appointment schedule and an optimized route are transmitted by the system 10 to drivers 17 and/or carriers 22. Information is transmitted to carriers 22 it is routed through to drivers 17. The driver 17 receives the route information from the system 10 and proceeds to pick up the required item from a starting location. A starting location may include manufacturers 25, warehouses 24, retailers 21, distributors 26, and distribution centers 23 as illustrated by FIG. 9. A driver 17 follows the optimized route and schedule provided by the system 10 to arrive at a customer location and the process continues with delivery of the item purchased by the customer 19, as illustrated by FIG. 23.

Figure 8:
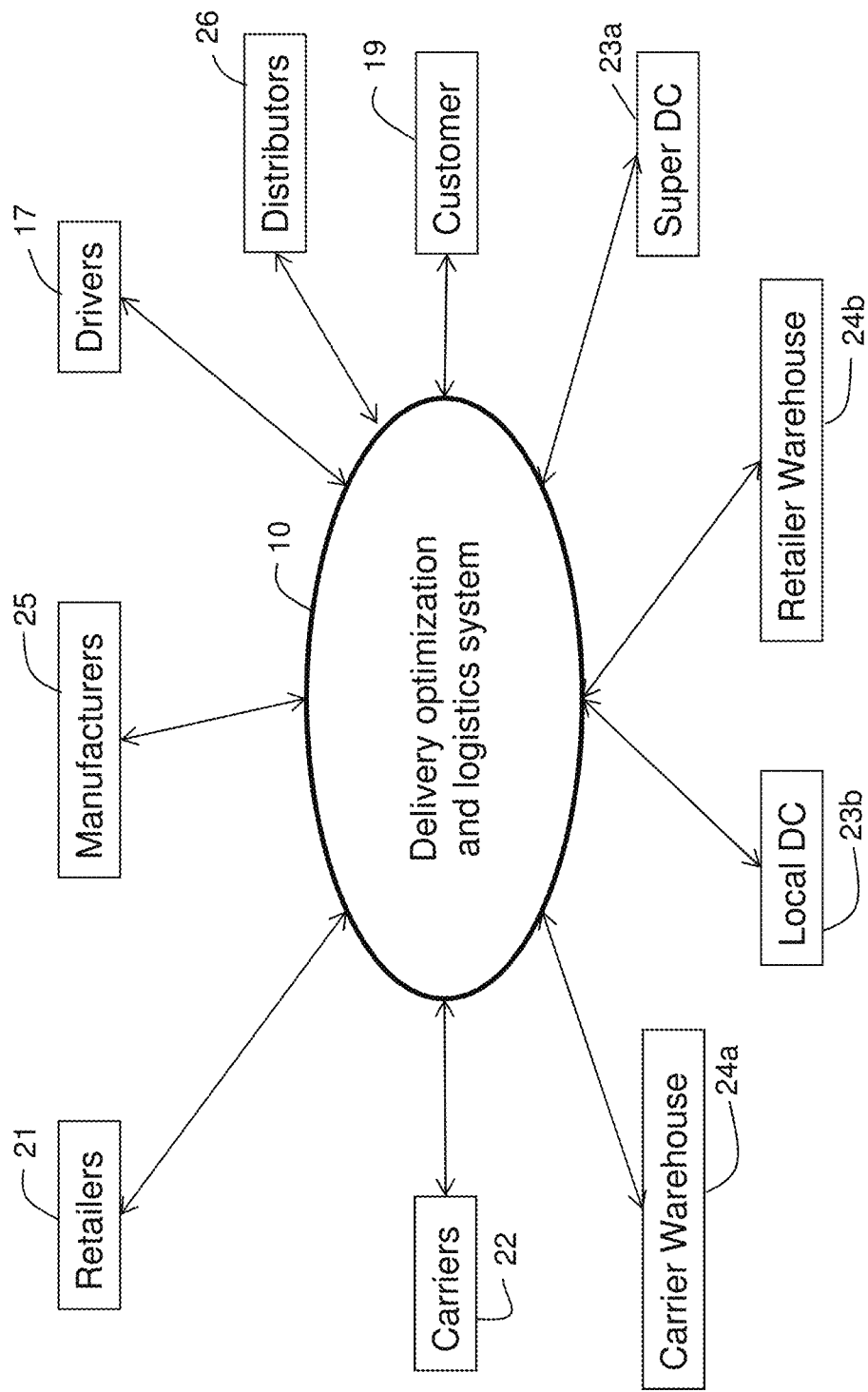
FIG. 8 illustrates an example of a communications network configured to enable a delivery optimization and logistics system to optimize delivery networks.

FIG. 8 illustrates an example of the system 10 and communication interfaces that enable data transfer through network interfaces 14 to entities that can include manufacturers 25, carrier warehouses 24a, retailer warehouses 24b, super distribution centers (i.e. national) 23a, distribution centers (i.e. regional) 23b, carriers 22, drivers 17, distributors 26, retailers 21, and customers 19. The role of each entity in relation to the system 10 is illustrated by way of example in FIG. 9. It can be appreciated that other entities not shown in FIG. 8 may send and receive data from system 10 components via a valid applicable network interface.

FIG. 9 illustrates an example of a logistics network. Distribution centers 23 can include super distribution centers 23a and local distribution centers 23b. A super distribution center 23a is a national distribution center (i.e. encompassed a large geographic region) that enables distribution of items within that region. A super distribution center's 23a role is to provide a primary tier distribution network. Super distribution centers 23a receive input and output to locations including, for example: local distribution centers 23b and external super distribution centers 23b. Input and output data flows include any physical goods or products. Items that are ordered from a retailer 21 that are not in stock are routed, if required, to a super distribution center 23a based on the proximity of a local distribution center 23b to a customer 19. Items are transported from super distribution centers 23a to local distribution centers 23b, and subsequently to warehouses 24. Warehouses 24 are interfaced with manufacturers 25, retailers 21, and carriers 22, and distributors 26 to transport or store items between the entities. Manufacturers 25 produce items sold by retailers 21. Carriers 22 manage fleets of drivers 17 that transport items directly to customers 19. A customer interacts with a retailer in order to purchase an item.

The system 10, illustrated by FIG. 1, provides an interface to components of the typical logistics network with services including inventory management, capacity management, just-in-time, item damage reporting, order management, demand forecasting, etc. The system 10 therefore provides a layer or platform that seamlessly integrates electronic commerce systems with multiple final or last mile delivery networks. In this way, spare delivery capacity in small and even single driver delivery companies can be optimized and matched with demand created within the electronic commerce systems. Given the near real time nature of electronic commerce systems, the system 10 facilitates on-demand matching of supply to demand to better serve customers and delivery networks by increasing efficiencies and providing an interface between the disparate systems.

Figure 10:
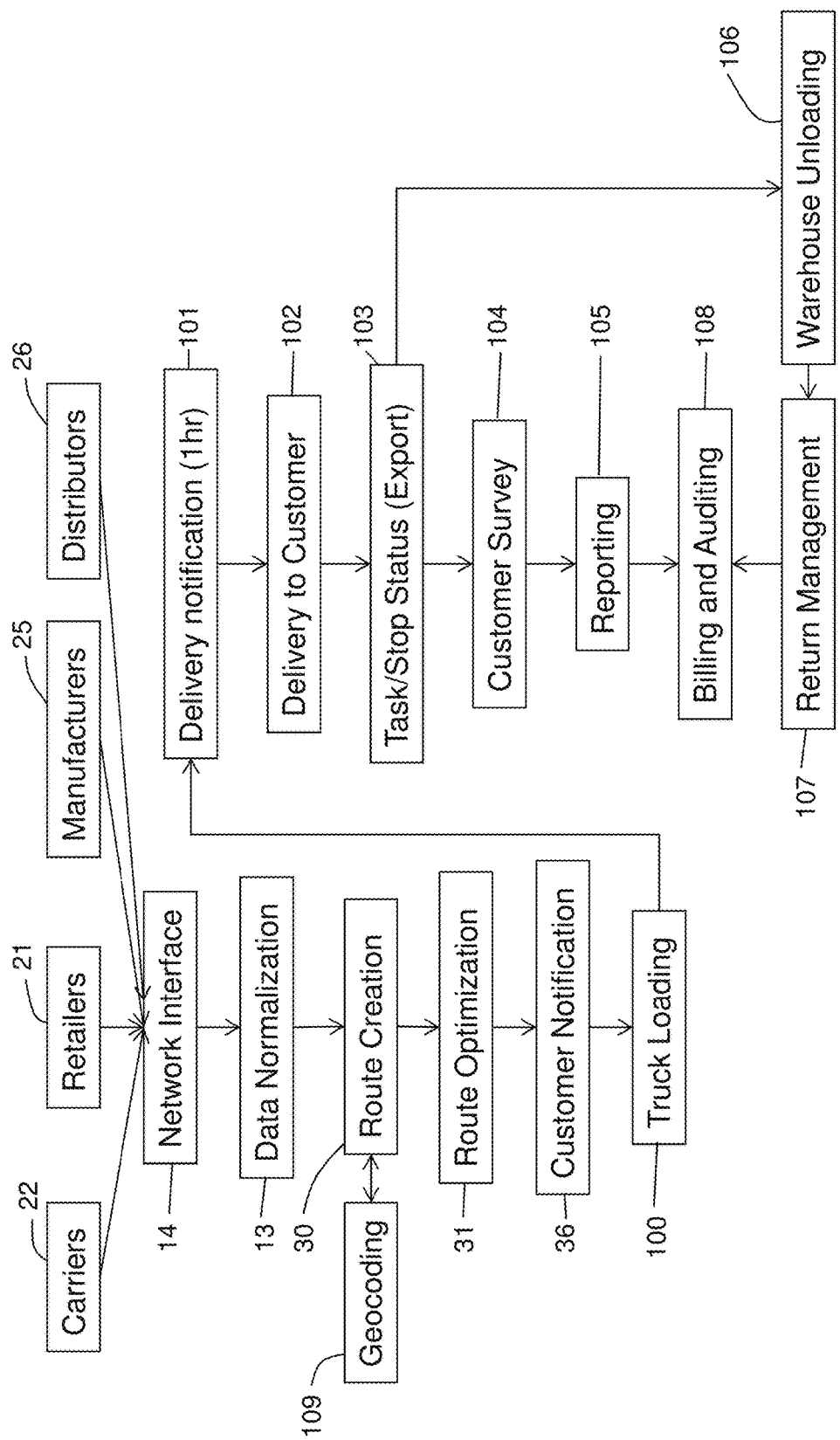
FIG. 10 illustrates computer executable operations performed in executing a process for enabling a final mile delivery system.

FIG. 10 illustrates an exemplary embodiment of a process that can be implemented by a final mile delivery management system 11. Data from carriers 22, retailers 21, distributors 26, and manufacturers 25 are received by a network interface 14. The network interface 14 is contained within the system 10. The received data can include customer data, order information, warehouse capacity, and manufacturing capacity as previously discussed. The data received is transmitted to a data normalization 13 component. The data normalization 13 component processes a customer location and configures the data string into a normalized (i.e. standard) format. A normalized address is geocoded 109 using GPS coordinates thus mapping the location(s) for delivery. The geocoding 109 is performed within the route creation 30 module. A geocoding system 109 receives the normalized address from the data normalization module 13 and computes the GPS coordinates of the civic address of a customer location 20.

The GPS coordinates are transmitted to a route creation system 30. The route creation system 30 generates maps and a route optimization 31 system determines the optimal route to follow for each delivery based on dynamic parameters, illustrated by FIG. 18. A customer receives a notification 36 after an appointment calendar has been established.

According to a schedule generated 35, truck loading 100 occurs and the final mile of the delivery process is initiated. During delivery the notification system, illustrated in greater detail in FIG. 21 (described below), detects, according to GPS coordinates, the appropriate time to transmit a notification 101 to a customer. The item purchased by the customer is delivered 102 to a customer location. A first report is generated 103 upon successful or unsuccessful delivery. The report generated 103 contains up to date data including without limitation status of the delivery, driver comments, and photos, illustrated in greater detail in FIG. 22 (described below). Status reports 103 provide requestors (e.g. retails, carriers, vendors, manufacturers) with data including the status of the delivery truck, the status of the stop, the delivery status of the items, driver scheduling, and data for warehouse management. In an implementation, data is split or partially provided to requesters based on the type of requestor requirements.

Reporting 103 of the delivery process is updated to provide requestors with the most up to date information possible. A customer survey is generated 104 a short time (i.e. 10 to 20 minutes) after delivery of an item. A customer survey provides valuable feedback for a logistics network. A short time delay between delivery of an item and a survey produces accurate feedback concerning a customer's experience. A driver returns to a final location to unload items 106 that were undeliverable or returned. A final location may include for example: a warehouse, a customer, a distribution center or a retailer. The undelivered items are processed 107 as illustrated in greater detail in FIG. 23 (described below). Existing billing and auditing procedures followed by the final destination are performed 108 with data generated by the existing system being transmitted to the system 10. Existing billing and auditing systems 108 generate billing information related to completed deliveries, uncompleted deliveries, and driver activities. A final report is generated 105, which can include various information as illustrated in FIGS. 28-33 described below.

Figure 11A:
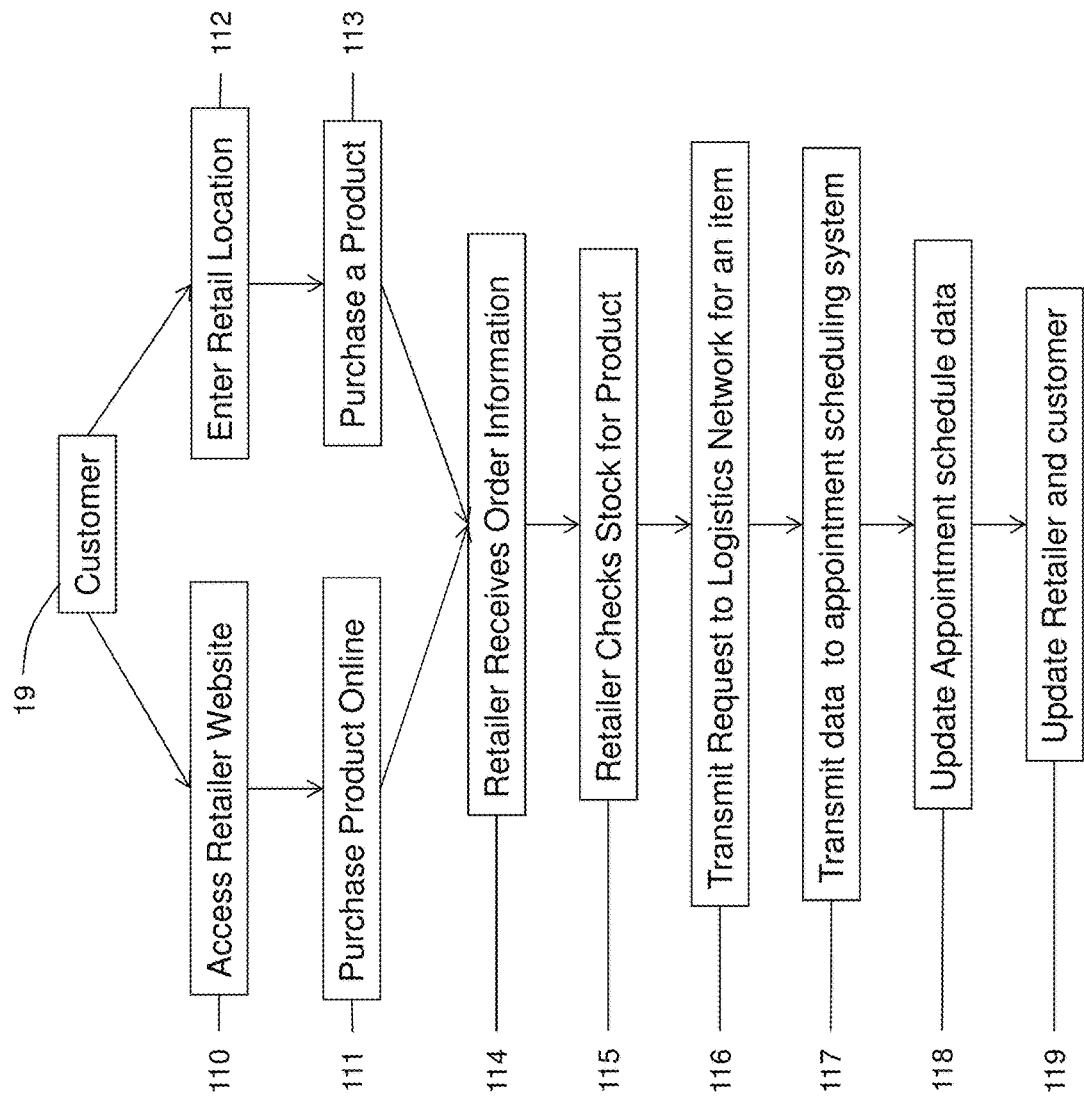
FIG. 11A illustrates computer executable operations performed in processing a customer order.

FIG. 11A illustrates the steps taken when an item ordered by a customer 19 is received by a retailer 21. In one exemplary embodiment a customer 19 accesses a retailer website 110 and purchases an item online 111. In another exemplary embodiment a customer 19 enters a retail location 112 and purchases a product 113. A retailer receives order information 114 from online orders 111 and in store orders 113. The order is initiated by the retailer by checking the stock 115 available; an example process is illustrated by FIG. 6 (described above). If the item is not in stock an external request is generated and transmitted 116 to the system 10 for an item, if an item is in stock then a customer 19 may be provided with an option to pick up the item at time of purchase. Customer data is transmitted 117 to the appointment scheduling module 12 if a customer selects a delivery option or the item selected is not in stock. The retailer and customer may then receive a delivery date and time window from the system 10.

Figure 11B:
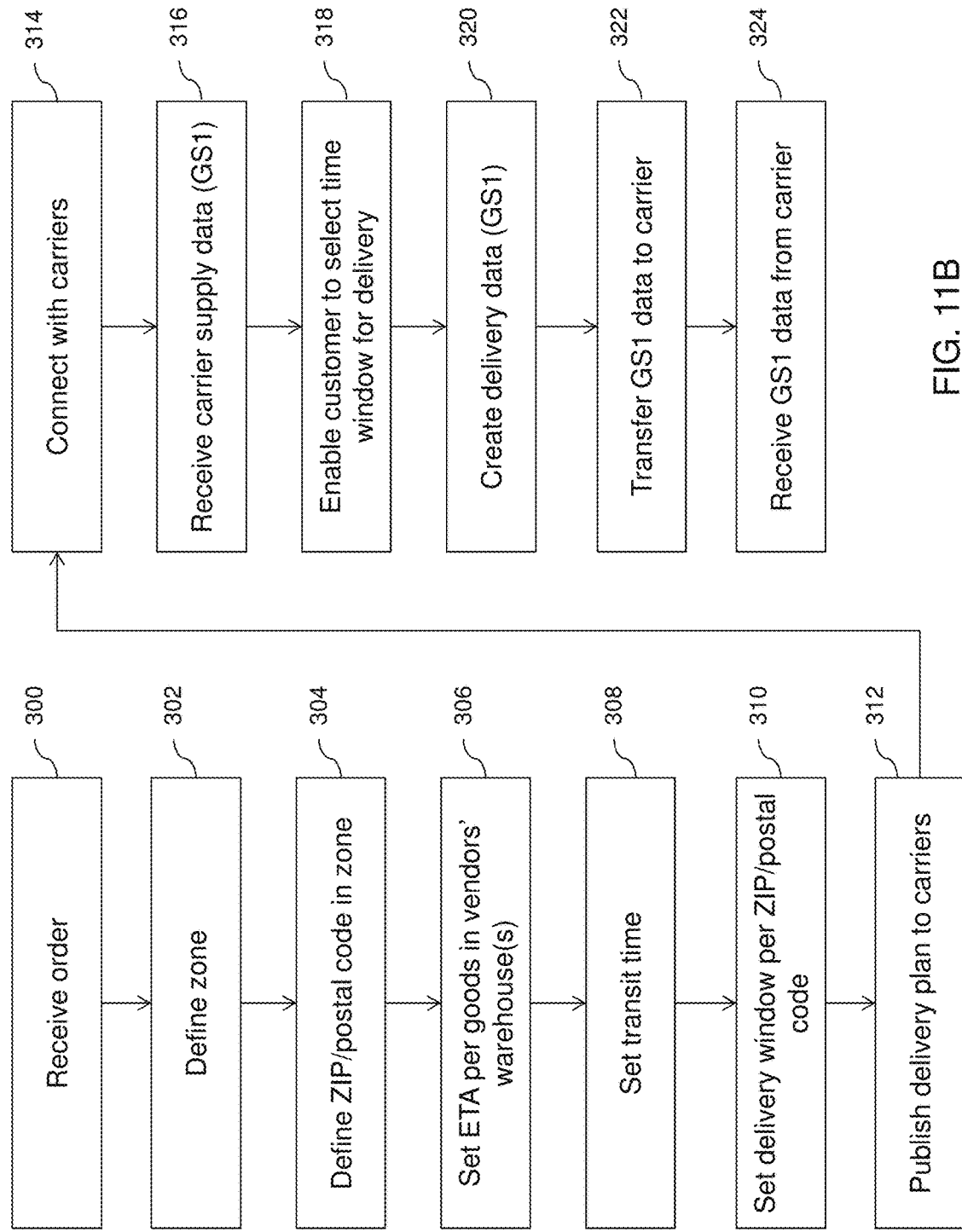
FIG. 11B illustrates computer executable operations performed in communicating with a carrier to arrange a delivery time window.

As noted above, the retailer 21 can include an interface that allows for real-time or near-real-time delivery window selection by exchanging standardized data (e.g., GS1 data) with carriers to enable the customer to select a preferred delivery window from a multitude of options currently available. This is also facilitated by the integration of the retailer's interface with the system 10 described herein, that allows for options to be selected from multiple carriers, thus enhancing the delivery experience for the customer. Turning now to FIG. 11B, an example of such a process implemented through the retailer 21 is shown.

At 300 the retailer 21 receives or otherwise processes a customer order. For example, as exemplified above, a customer may engage the retailer in a store or online and request delivery of one or more items. Based on the delivery destination, a delivery zone is defined at 302, and the ZIP/postal code for that zone is defined at 304. This allows the retailer to determine an estimated time of arrival (ETA) based on the availability of the goods in the vendor's warehouse at 306 (i.e. where the goods are, and if they are currently available). The location of the goods being shipped, and the ZIP/postal code for the destination enables the transit time to be set at 308, and a delivery window to be set at 310. These parameters allow the retailer to publish the delivery plan to carriers through the system 10 at 312. The retailer 21 also connects with the carriers at 314 and receives standardized (e.g., GS1) supply data from the carriers at 316. In this way, the retailer 21 uses the system 10 determine, from potentially many available carriers, various time windows and delivery options that can be presented to the customer. Providing the delivery plan at 312 also enables other carriers connected to the system 10 to become aware of a potential delivery job. The retailer 21 is then able to allow the customer to select a time window for the delivery at 318, e.g., at a physical store, or via an e-commerce transaction. It can be appreciated that the selected time window can be determined in various ways. For example, a consumer 19 may suggest a suitable time window, which the system 10 uses to find a suitable carrier 22. Alternatively, the consumer 19 may have multiple suitable times and/or wish to find a time window that is as soon as possible. The intermediary operability of the system 10 enables this scenario to also be addressed, by being able to search amongst multiple carriers to find the best time window and/or a multitude of options from which the consumer can choose.

The delivery data is created at 320, in a standardized format such as GS1. For example, the delivery data can include a unique ID, an invoice number, name, address, phone number, item, task, time window(s). This standardized data is then transferred to the carrier at 322. The data received by the carrier is then used to perform or instruct to be performed, the actual delivery of the item. The carrier also returns standardized data to the retailer 21 in the course of implementing the delivery, for example, the unique ID for the order, the unique ID of the vehicle used for delivery, a route and/or stop order, GPS location(s), date and time of delivery, signature of customer, status of delivery, pictures, date and time of receiving, condition on receiving, location in warehouse, when the item is loaded in the vehicle, etc. This standardized data can be sent to the retailer 21 as it is available, in batches, or otherwise sent according to network connectivity. The retailer 21 and carrier 22 can coordinate the actual delivery itself in various ways depending on whether or not these entities are using a system-specific integration, such as a portal into the system 10. In this way, the retailer 21 and/or carrier 22 can either rely on the system 10 for scheduling and optimizing routes (e.g., as described herein), or can use other optimization/scheduling systems to meet the demand matched to their supply, which was facilitated by the system 10.

FIG. 12 illustrates an exemplary process for scheduling a delivery appointment. A request for delivery 116 initiates an appointment scheduling process. The request 116 is analyzed 120 to determine if the customer is new or has made previous requests for a delivery. Analysis of the delivery request 120 proceeds by checking the existing customer database 34 for a matching customer. If a customer is new the customer's data is entered 121 into a customer database 34. The original request for delivery 116 is verified 122 to ensure accurate deliveries.

Available time windows for delivery are determined 123 through a delivery calendar generation subsystem 35. The delivery calendar generation subsystem 35 checks the time window provided by a customer against the existing scheduled appointments to find a viable delivery time window. An appointment is scheduled at 124 in an available time window, and the delivery calendar is updated to have that time window allocated to the appointment being generated. The appointment schedule is transmitted to a customer via a notification 125 generated by a notification module 36. The customer database 34, delivery calendar generation 35 and notification module 36 are contained within the appointment scheduling module 12, shown in FIG. 3.

FIG. 13 illustrates an auto scheduling system configured to generate delivery requests. A request to update appointments 130 is generated at predetermined time intervals (i.e. hourly, daily, etc.) or if a new appointment is entered into the delivery appointment schedule database 34. After an update request 130 is generated customer data is verified, for example, as follows: a time since a last delivery was made is checked 131, frequency of deliveries is checked 132, and customer availability is checked 133. If, respective to each stage of the previously described process, the time since a last completed delivery 131 is too long, the frequency of deliveries corresponds with a required delivery 132, and the customer is available 133 a delivery appointment is automatically scheduled 134.

The appointment scheduling module 12 receives the request for delivery and performs the scheduling operation illustrated by FIG. 12. If any of the requirements for an appointment are not fulfilled no appointment is scheduled and the update ends 135, for example the time since a last delivery 131 is too short, the customer does not receive deliveries frequently 132, or the customer is unavailable 133.

FIG. 14 illustrates an exemplary process for receiving and normalizing data 13 from a network interface 14. Data required by the system 10 originates from a vast array of different system types and interfaces. Data received at the network interface 14 is not normalized and may not correspond with the system 10 requirements. Highly accurate data is required for the final mile delivery module 11 and the appointment scheduling module 12. Thus data transmitted to the system 10 must be received with limited to zero rejections. Errors in data received particularly inhibit the accuracy of route creation 30 and route optimization 31, illustrated in FIG. 1. Data is received 140 through a parallel pipeline process. Data is normalized through two normalization systems; a first normalization system 141 and a second normalization system 142. The normalized data from systems 1 and 2 respectively 141 and 142 are synchronized 143 and standardized data 144 is sent to the output 145. The parallel pipeline with synchronization 144 greatly increases the throughput of data to the output 145. The output 145 is a general term for subsystems contained within system 10.

FIG. 15 illustrates an example of the components used for route creation 30. A primary geographic region 150 is defined based on large scale physical obstructions (e.g. mountains, rivers, lakes, territorial borders). The geographic region 150 is split into sub sectors 151 using data attributes including without limitation weather 158, traffic 157, and construction 156. Sub sectors 151 are geographic areas defined by a unique set of parameters. It should be appreciated that other parameters may be generated for use as sub sector 151 parameters. Sub sectors 151 are analyzed in detail to develop child sub sectors 152. The analysis of sub sectors 151 proceeds by further refinement 159 of the parameters associated with an original sub sector 151. The child sub sectors 152 are defined by using the refined attributes 159 of each parent sub sector 151. In one exemplary embodiment the sub sector 151 has a traffic attribute 157 that is designated as "heavy", a child subsector 152 may have a traffic attribute 157 of very heavy while another child subsector 152 may have a traffic attribute 157 of moderately heavy. Increased refinement of designated parameters increases the accuracy of route optimization 31. Child subsectors 152 are split into zones dependent on the anticipated traffic flow rate through the region. In one exemplary embodiment the zones are categorized into three parts; a fast zone 153, a regular zone 154, and a slow zone 155, with traffic rates designated as fast, medium and slow respectively.

Figure 16:
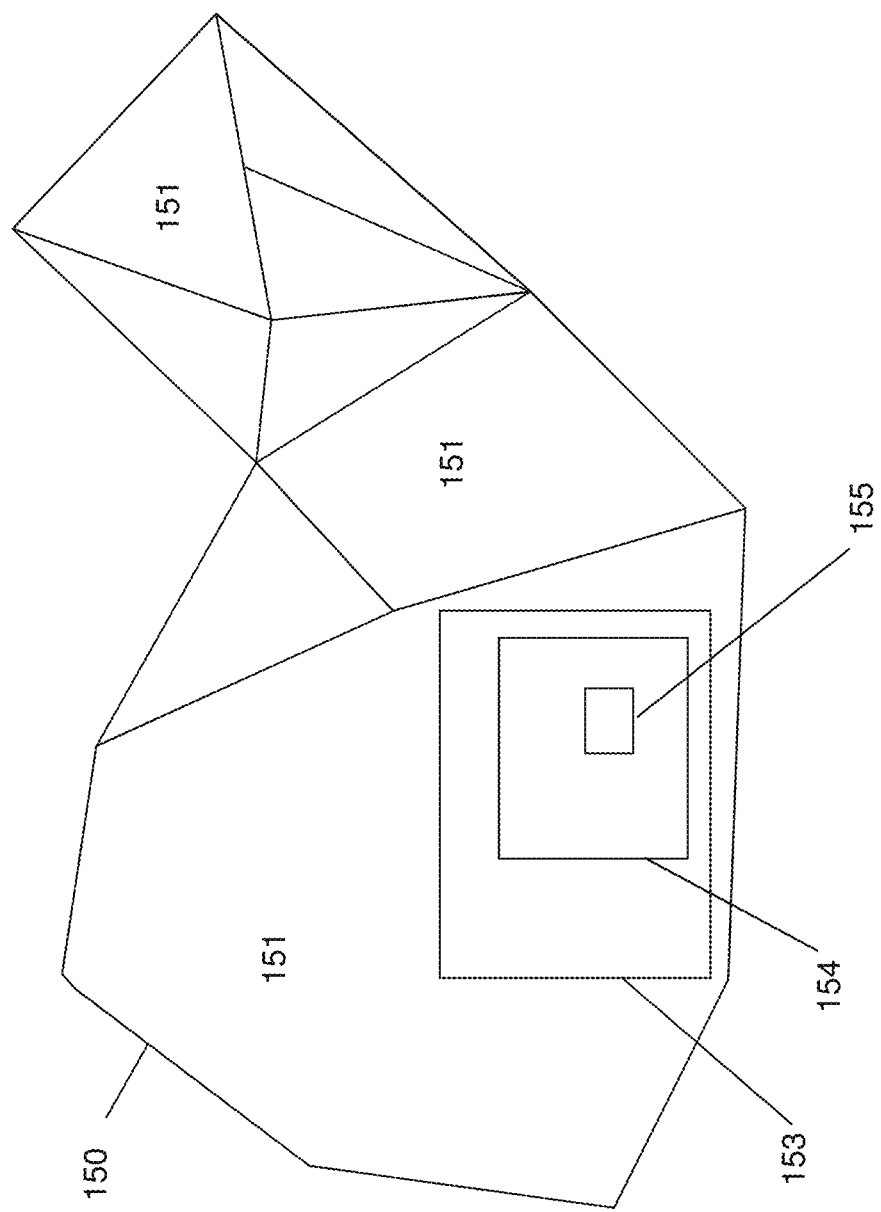
FIG. 16 is an example illustration of a geographic region sub division.

FIG. 16 illustrates an exemplary representation of a map 150 with subsectors 151 and child subsectors 153,154,155. Subsectors 151 contain multiple child subsectors 153,154, 155. Refined attributes of each subsector 151 increase details of each region defined. In one exemplary embodiment the smallest zone 155 represent the slowest traffic, the middle zone 154 represents average traffic levels, and the largest zone 153 represents the fastest traffic routes such as highways. In another exemplary embodiment a route is calculated from one point to another by avoiding all of the slowest areas 155. In an additional exemplary embodiment a truck is ahead of schedule thus may be routed through a slower area 155 to save fuel and maintain scheduled appointment times. It should be appreciated that traffic levels are monitored in real time (or near real time) and zones 153,154,155 are updated to account for changes in traffic patterns. (i.e. morning rush hour one way, evening rush hour the other way)

Figure 17:
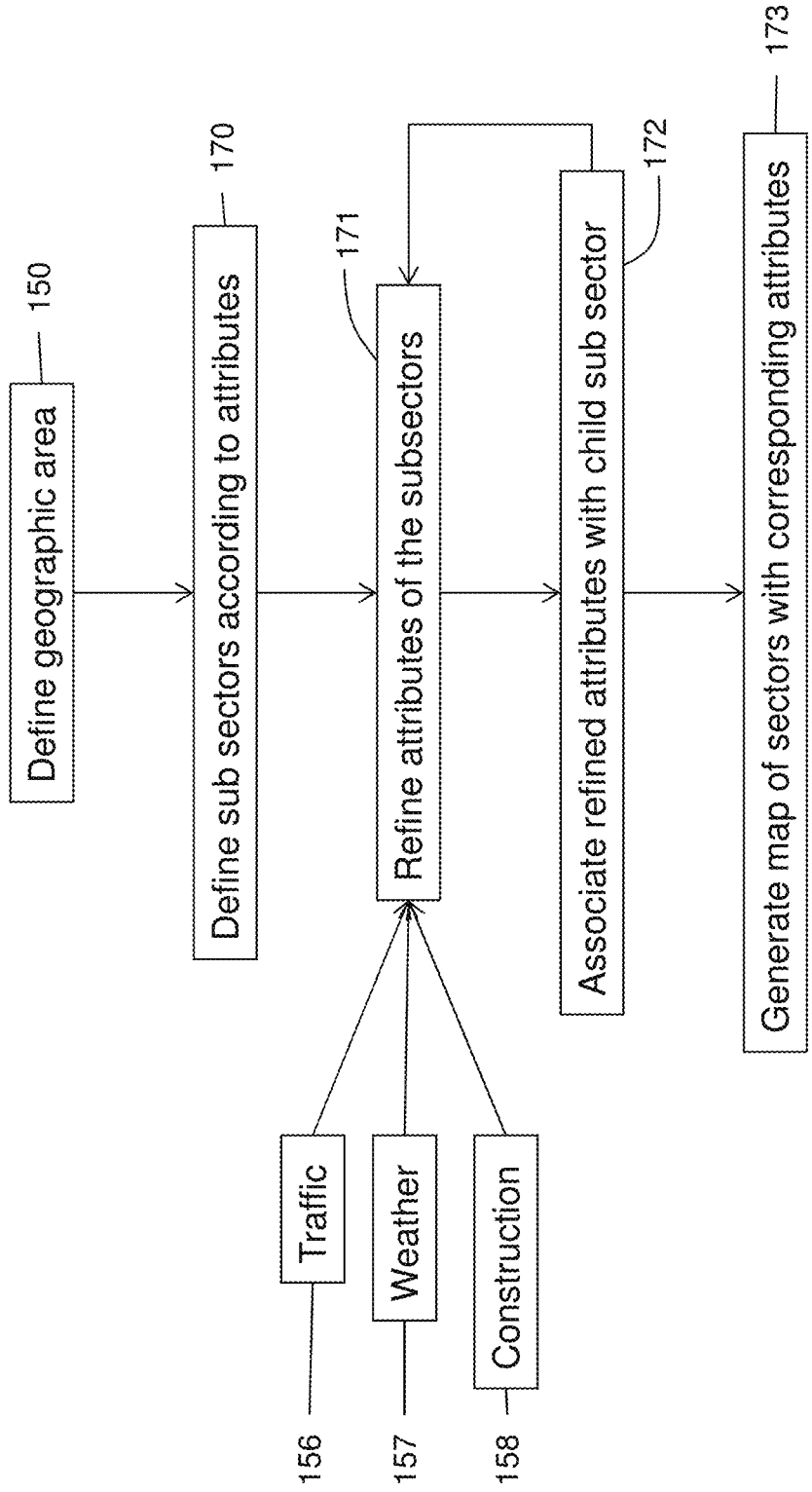
FIG. 17 illustrates computer executable operations performed in splitting a geographic area into subsectors.

FIG. 17 illustrates an exemplary process for determining region mapping. The first step defines a geographic area 150. The area 150 encompasses a complete logistics network involved with a delivery process. In one exemplary embodiment the area contains all entities associated with a local distribution center, as illustrated by FIG. 4. Subsectors are defined 170 by associating particular attributes of regions of a geographic area 150. For example a subsector may be defined 170 as a downtown core, or suburbs. Sub sector attributes are refined 171 by using local attributes including without limitation traffic 156, weather 157 and construction 158 to more accurately represent child sub sectors 172. The process of refining attributes iterates according to available data accuracy. After all desired iterations are completed a map is generated 173 according to corresponding attributes that are generated by the above process.

Figure 20:
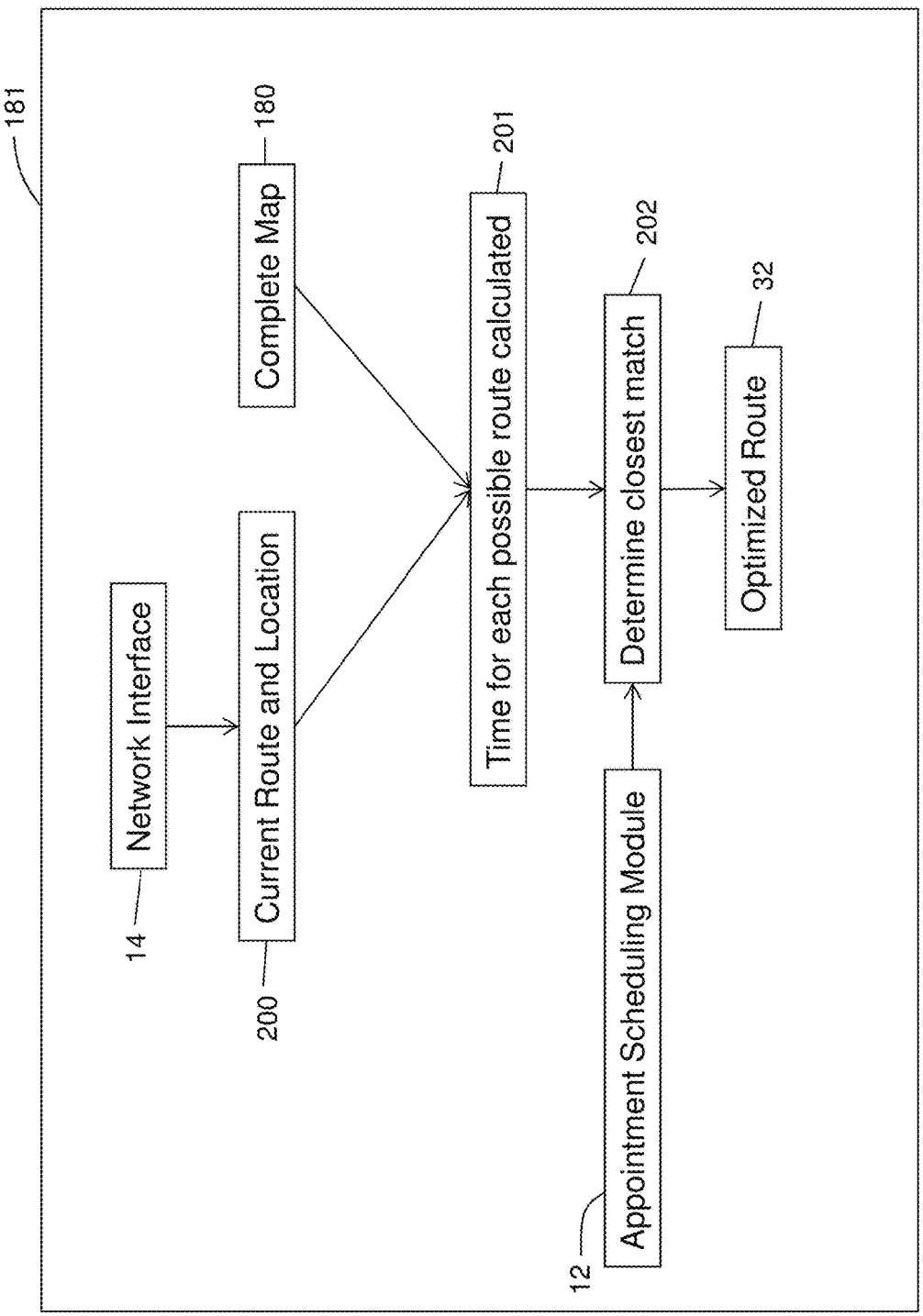
FIG. 20 illustrates computer executable operations performed in a route optimization process.

FIG. 18 illustrates an example of components for a route optimization system 31. In one embodiment three maps are required for a route optimization system 31; the maps integrate fast zones 153, regular zones 154 and slow zones 155, the generation of such maps is illustrated in FIG. 15. The three maps are integrated into a complete map 180 encompassing all elements of a select region. The fast zone map 153 is a map that contains high volume through fares including for example highways, toll routes, and express roads. The regular zone map 154 is a typical map of existing routes that are available for travel with average traffic patterns. The slow zone map 155 contains all the slowest areas (e.g. downtown during rush hour traffic). A complete map 180 offers a combination of maps (153,154,155) to send to the route optimization process 181. The optimization system 181 receives input from the complete map 180 and the delivery appointment schedule 35. The optimization system 181 performs an optimization (e.g. as illustrated in FIG. 20 and described below) and outputs an optimized route 32 to the network interface 14. An optimized route 32 is the best route for a driver to follow based on any road conditions and appointment schedules.

Figure 19:
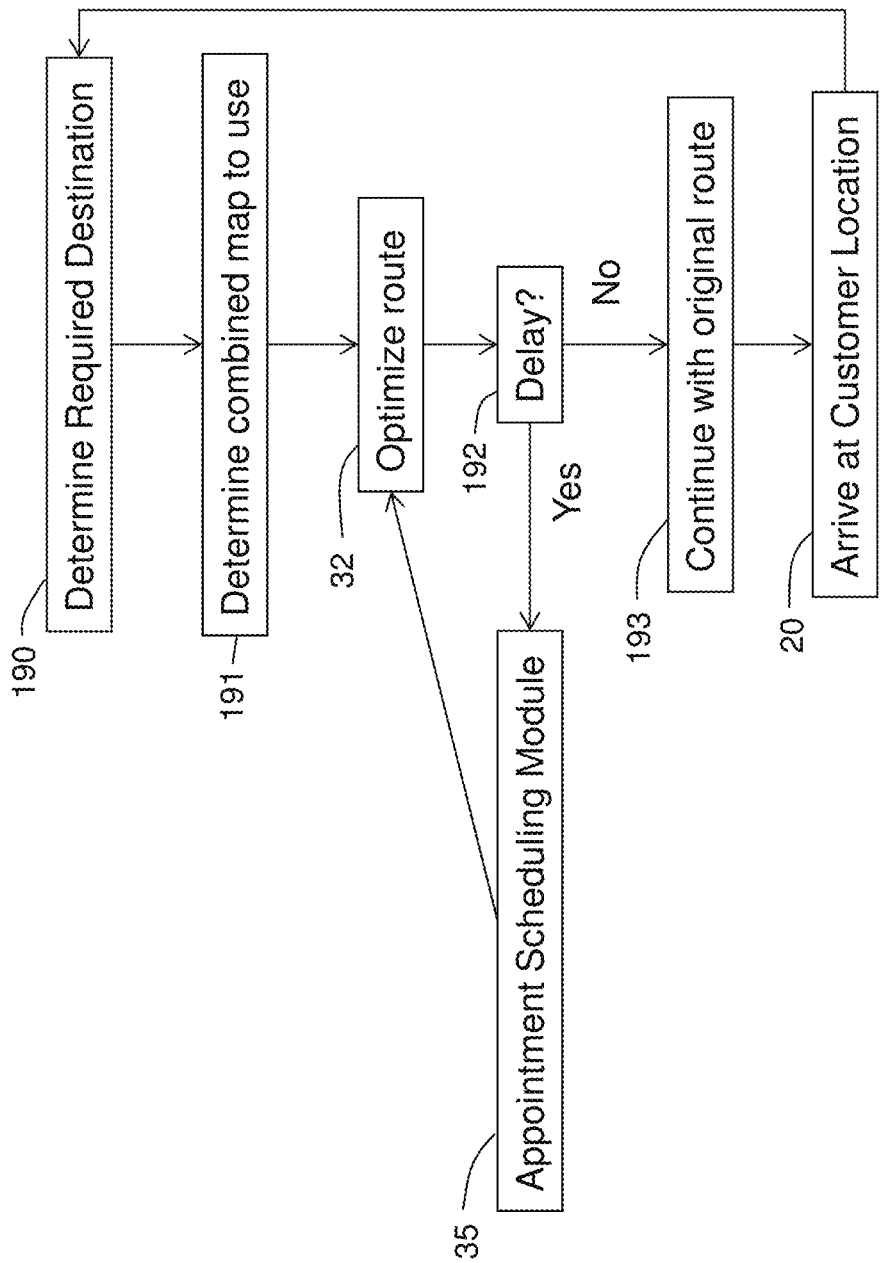
FIG. 19 illustrates computer executable operations performed in road creation and optimization.
Figure 22:
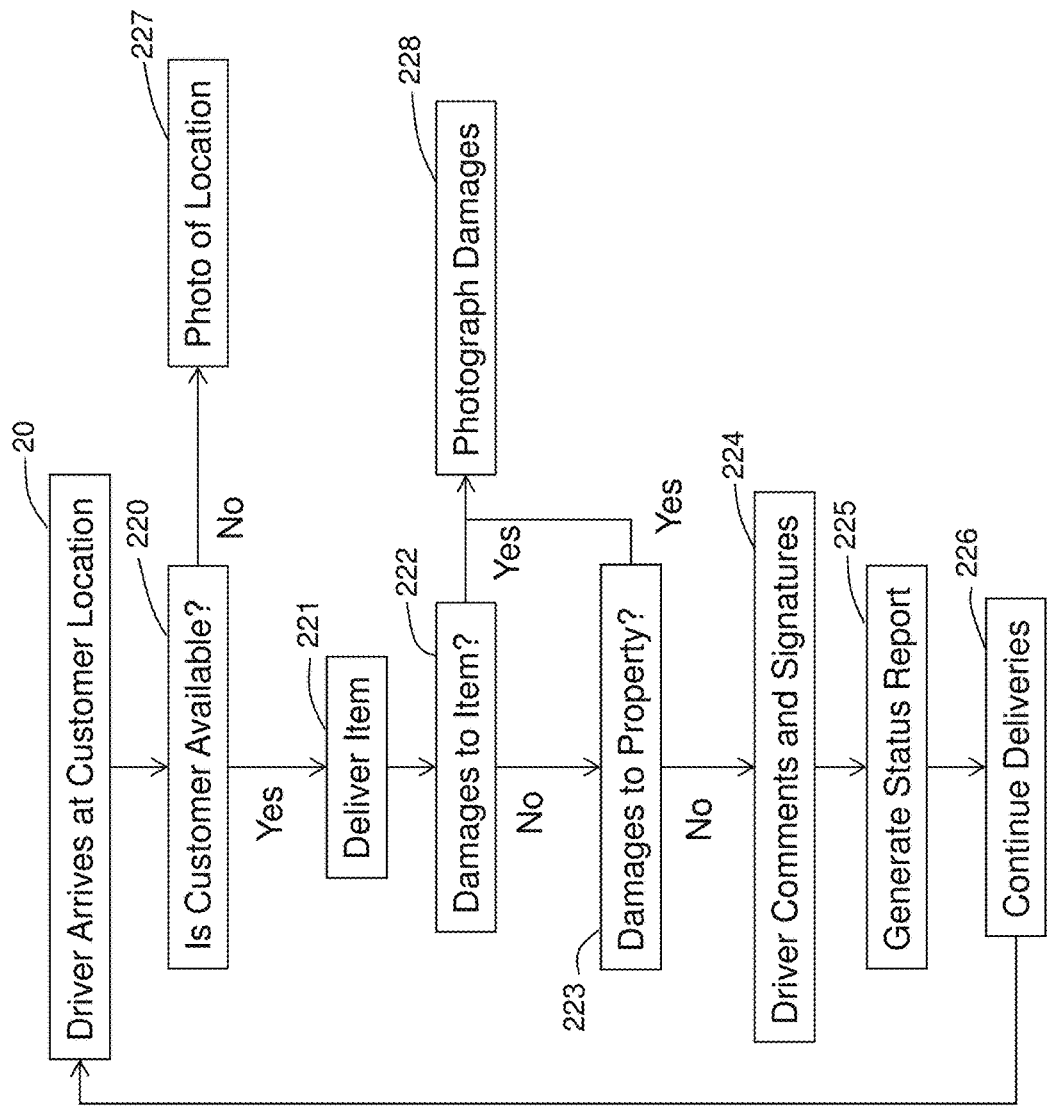
FIG. 22 illustrates computer executable operations performed in a delivery process.

FIG. 19 illustrates an exemplary process followed by a route optimization system 31. A starting location 190 and an ending location 20 are determined through route information. The starting and ending locations are used to determine the map to use associated with a relevant region of operation. An exemplary embodiment of a map used is illustrated by FIG. 16. The optimized route is generated, as illustrated by FIG. 18, and delivery proceeds as normal as illustrated by FIG. 22. If a delay 192 is encountered data concerning the delay is transmitted to the appointment scheduling module 35 and a newly optimized route may be issued if a conflict is found. A conflict includes, for example, arriving ahead of schedule or behind schedule. If no delay is encountered a driver continues with an originally optimized route 193 to arrive at a customer location 20. The process above repeats for each destination that is required to be visited by a driver.

FIG. 20 shows an example of a route optimization module 181. A current location 200 is determined through data received from a network interface 14. The current location includes, for example: a location of a driver's device, a starting location, or an ending location. A complete map 180, as illustrated by FIG. 18, and a current location 200 are used to calculate times to a destination via multiple routes 201. The appointment scheduling module 12 is configured to transmit the scheduled times of arrival that a particular driver may follow. The scheduled times 12 and the possible times calculated 201 are compared to determine a closest match 202. It should be appreciated that other factors such as fuel economy, and operating regions may be taken into account when determining a closest match 202. The closest matched route 202 is transmitted to a network interface 14 as an optimized route 32.

FIG. 21 illustrates an example method for transmitting notifications to a customer. An optimized route 32 is used to continuously update the appointment schedule 35. The resultant notifications 36 are highly accurate in terms of when the notifications 36 are issued to the customer device 18. Modifications in the appointment schedule 35 are automatically reflected in the notification 36 issue time. In one exemplary embodiment notifications 36 are issued at: an initial time of acceptance 210, at 48 hours to delivery 211, at 24 hours to delivery 212, and at 1 hour to delivery 213. The 1 hour delivery notification 213 may use real-time data from the schedule data 35 to notify the customer 19 when delivery of an item is anticipated to be within an hour, including any delays in transportation. In a preferred embodiment the customer notification system 36 transmits a message to the customer 19 with data pertaining to the delivery schedule at least 48 hours 211 in advance of delivery. Notification 36 may occur through any available communication channel, for example: a phone call, SMS, e-mail, or an instant message.

FIG. 22 illustrates an exemplary embodiment of the process involved in delivery or pickup of an item. A delivery of an item by a driver occurs at the customer location 20. If the customer is available 220 the purchased item is delivered 221. If the customer is not available 220 a photo of the customer location is captured 227 by a driver device. If an item is damaged 222 during the delivery process, pictures are captured 228 for future reference. If property is damaged 223 during the delivery process, pictures are captured 228 for future reference. The delivery process is completed when a customer 19 signature is captured 224 by a driver device including any driver comments 224. A status report is generated 225 to update the system 10 of the status of the delivery process and any problems that may have occurred. After each delivery is completed the deliveries continue 226 until all scheduled deliveries are completed. Photos and comments are captured by the driver device 16 and transmitted to the system 10, capturing field data may assist in obviating future conflict by providing references. Field data includes without limitation photos, comments and signatures.

FIG. 23 illustrates an example process that can be executed after a transport returns from a scheduled appointment or a group of scheduled appointments. In one embodiment a truck returns from deliveries 230 when all items originally loaded onto the transport have been delivered or an attempt to deliver the items has been made. A check of undelivered items is performed 231 to account for all items. Undelivered or returned items in the transports are scanned 232 and returned to a storage location 233. The appointment schedule data is updated and available transportation is updated 234 for delivery. Scanning the item is performed by either the driver device 16 or an equivalent device located at the storage location. Scanning an item includes without limitation reading a barcode, taking a photo, or checking a serial number.

Figure 24:
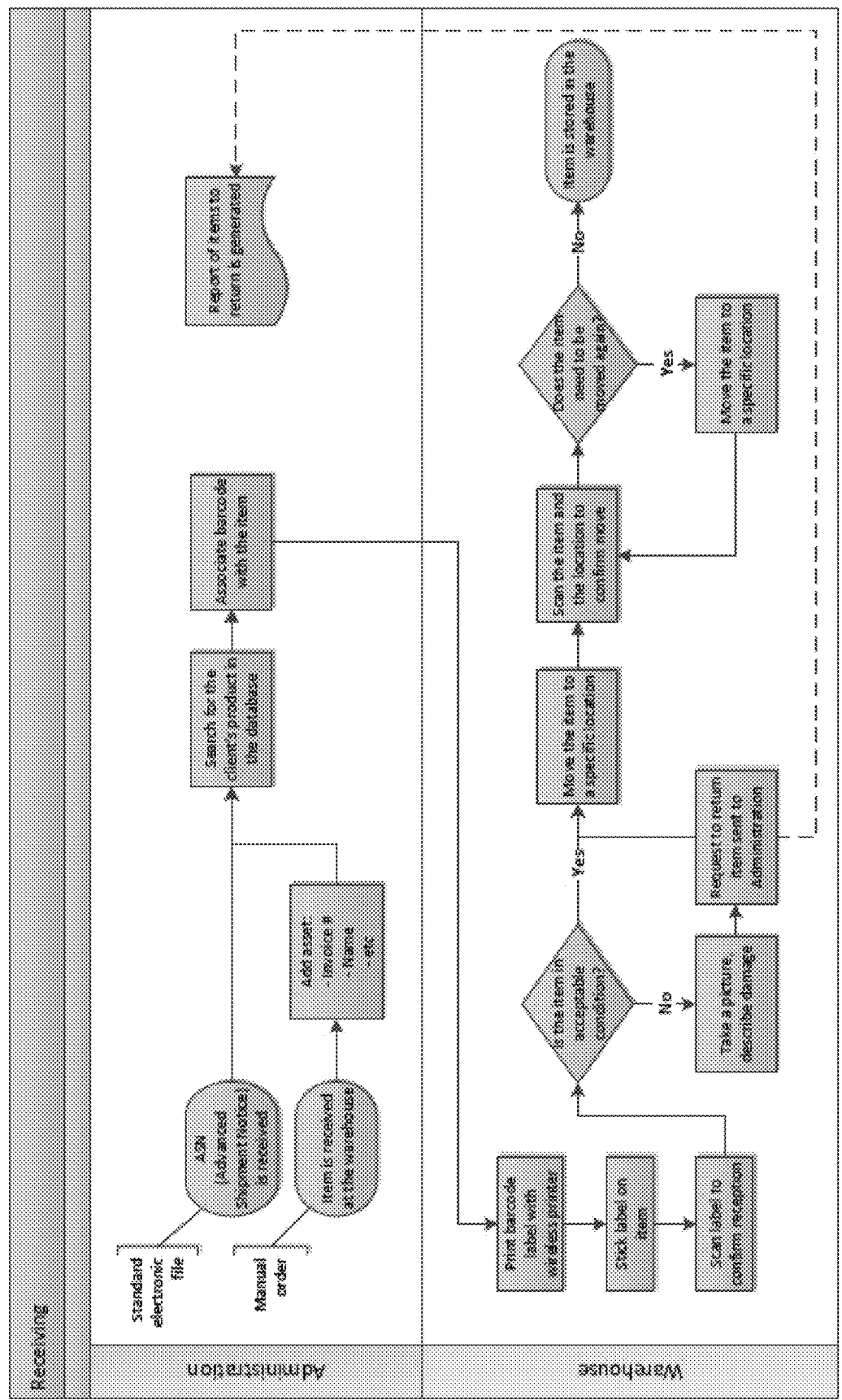
FIG. 24 illustrates computer executable operations performed in item management processing.
Figure 25:
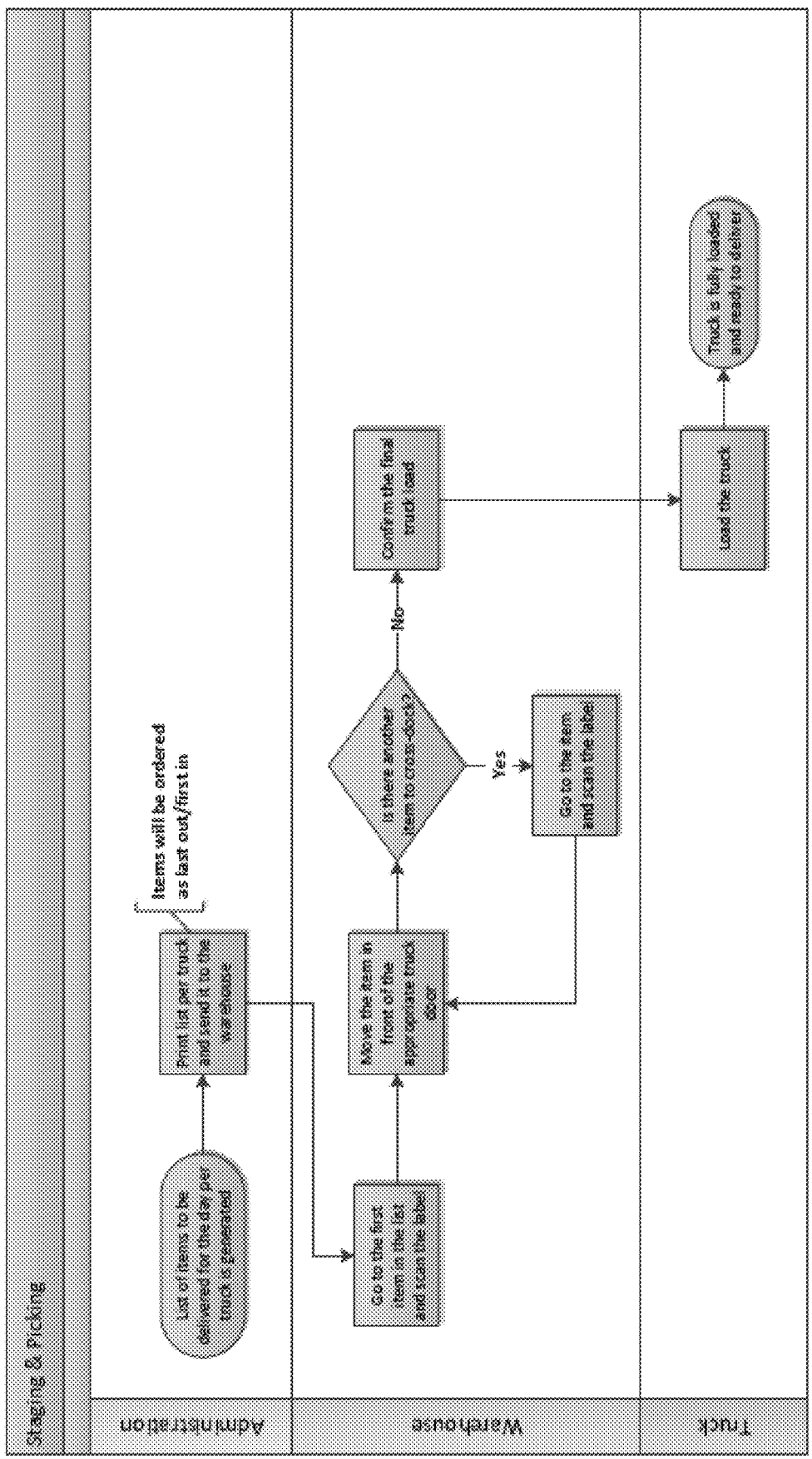
FIG. 25 further illustrates computer executable operations performed in item management processing.
Figure 26:
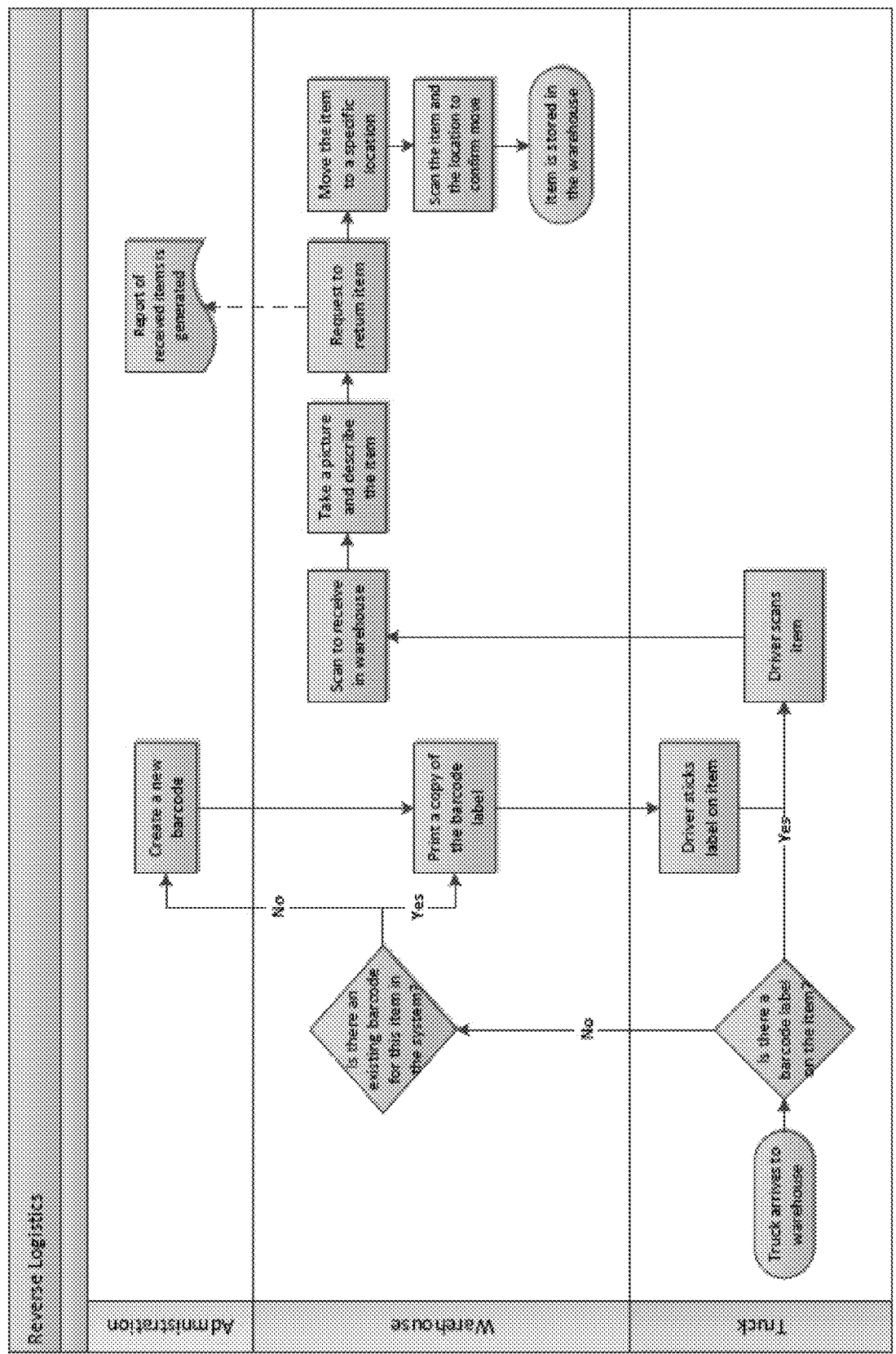
FIG. 26 further illustrates computer executable operations performed in item management processing.

Turning now to FIGS. 24-26, item management processing is shown. FIG. 24 shows a process implemented during a receiving stage. A standard electronic file or manual order are received by an administrator. The electronic file is received as an advanced shipment notice (ASN) and the manual order corresponds to receipt of an item at the warehouse 24. When an item is received at the warehouse, an asset is added, for example an invoice number, name, etc. is added to the system. Whether an electronic or a manual order, a search for the client's product is made in the database and a barcode is associated with the item to enable tracking and item management. The generated barcode is then sent electronically to the warehouse 24, where it is printed on a label, e.g. using a wireless printer, and the label is applied to the item and scanned to confirm reception of the item. It is then determined whether or not the item is in an acceptable condition. If not, an image is taken of and any damage described, and a request is sent to the administrator to return the damaged item. The item is then moved to a specific location in the warehouse 24 and the item is scanned at that location to confirm any movement of the item. It is then determined if the item needs to be moved again. If not, the item is stored in the warehouse for subsequent shipment and delivery. If so, the item can be moved and scanned again.

FIG. 25 illustrates a process that can be implemented during a staging and picking stage. In this example, an administrator generates a list of items to be delivered on a particular day, for each truck, and prints this list and sends it to the warehouse 24. As illustrated in FIG. 25, the items can be ordered first in, last out, to facilitate unloading in a logical order. At the warehouse 24, the first item on the list is determined and that item is moved to the appropriate truck for loading. It is then determined if there is another item to cross-dock. If not, the final truck load is confirmed. If so, the next item is found, scanned, and placed in front of the truck for loading. The truck is then loaded and ready for delivery.

FIG. 26 illustrates a process that can be implemented during a reverse logistics stage, i.e. when an item returns on a truck. In this example, a truck arrives at the warehouse 24 and it is determined if there is a barcode label on the item. If so, the driver scans the item. If not, the warehouse system is used to determine if there is an existing barcode for the item in the system. If not, a new barcode is created. If so, a copy of the barcode label is printed and can be applied to the item by, for example, the driver. After the driver scans the item, the warehouse scans to receive the item and takes an image of the item and describes the item. The warehouse system then sends a request to return the item. A report is received by the administrator, and the item is moved to a specific location for subsequent scanning and storage.

Figure 27:
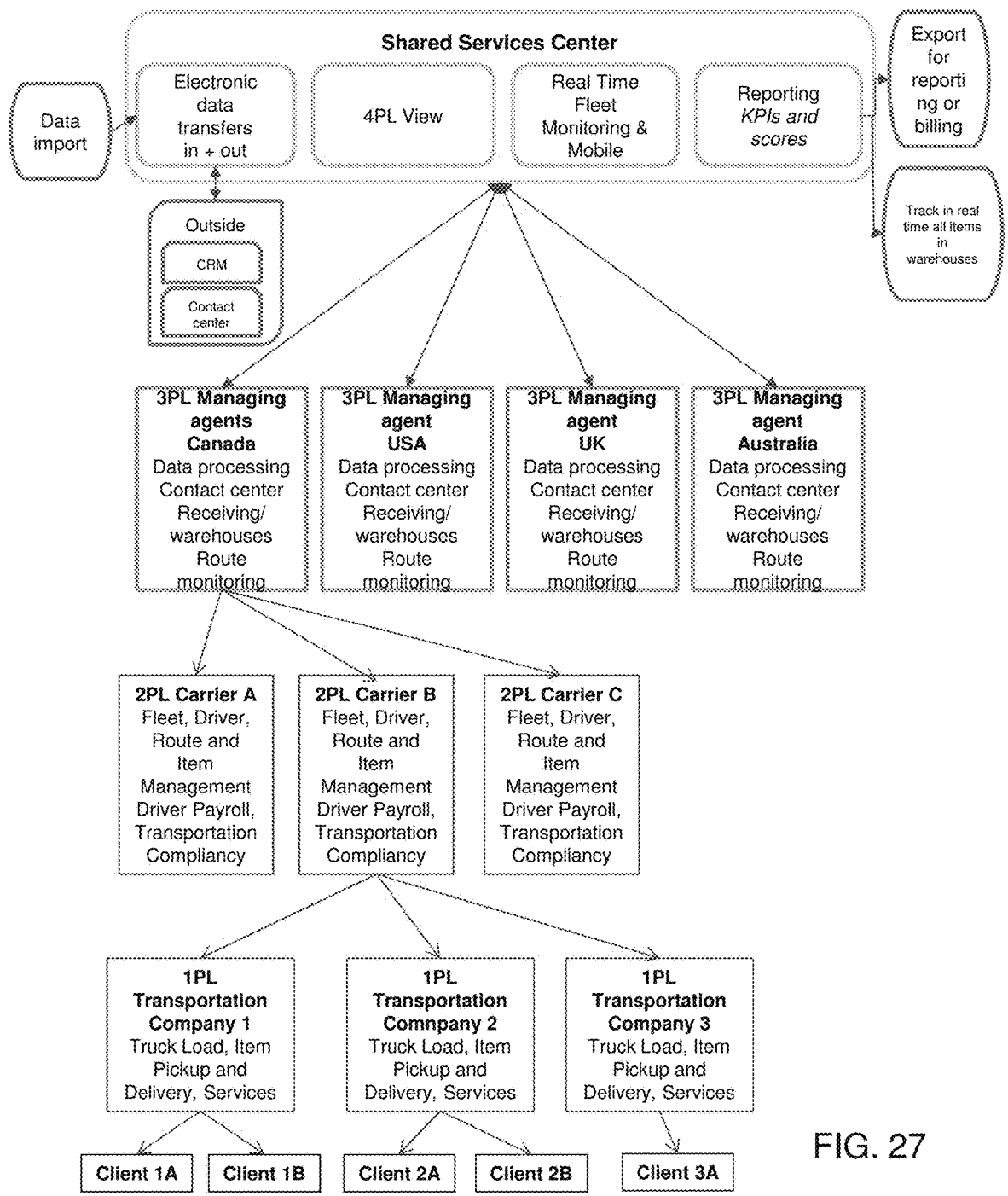
FIG. 27 illustrates an example configuration for implementing $1^{st}$ Party Logistics (1PL), 2PL, 3PL, and 4PL.

FIG. 27 illustrates how the system described herein brings together 1 PL, 2PL, 3PL, and 4PL services. As shown in FIG. 27, the delivery optimization and logistics system 10 can be considered a shared services center providing 4PL services to one or more 3PL managing agents in various jurisdictions or geographical areas (e.g., Canada, USA, UK, and Australia as shown by way of example in FIG. 27). The 3PL managing agents each provide data processing contact centers, receiving, warehouses, and route monitoring for one or more 2PL carriers 22, e.g., Carriers A, B, and C as illustrated in FIG. 27. Each carrier 22 provides fleet, driver, route, and item management capabilities as well as driver payroll, transportation and compliance. Each carrier 22 interacts with one or more 1 PL transportation companies, e.g., companies 1, 2, and 3 as shown in FIG. 27. In this way, the 4PL shared services center links together 4PL down to 1PL services, even for single truck operations. The 1PL companies provide truck loading, item pickup and delivery, and other "final mile" services as herein described, for one or more clients, i.e. the consumers 19.

The example configuration for the shared services center in FIG. 27 includes one or more interfaces for data transfers into and out of the system 10, for data imports, and outside CRM and contact center capabilities. A 4PL view is also provided for administrators, along with real time fleet monitoring and mobile services, reporting, and exporting capabilities. In this example, data can be exported for reporting or billing and to track in real time all items in the warehouses 24.

Figure 28:
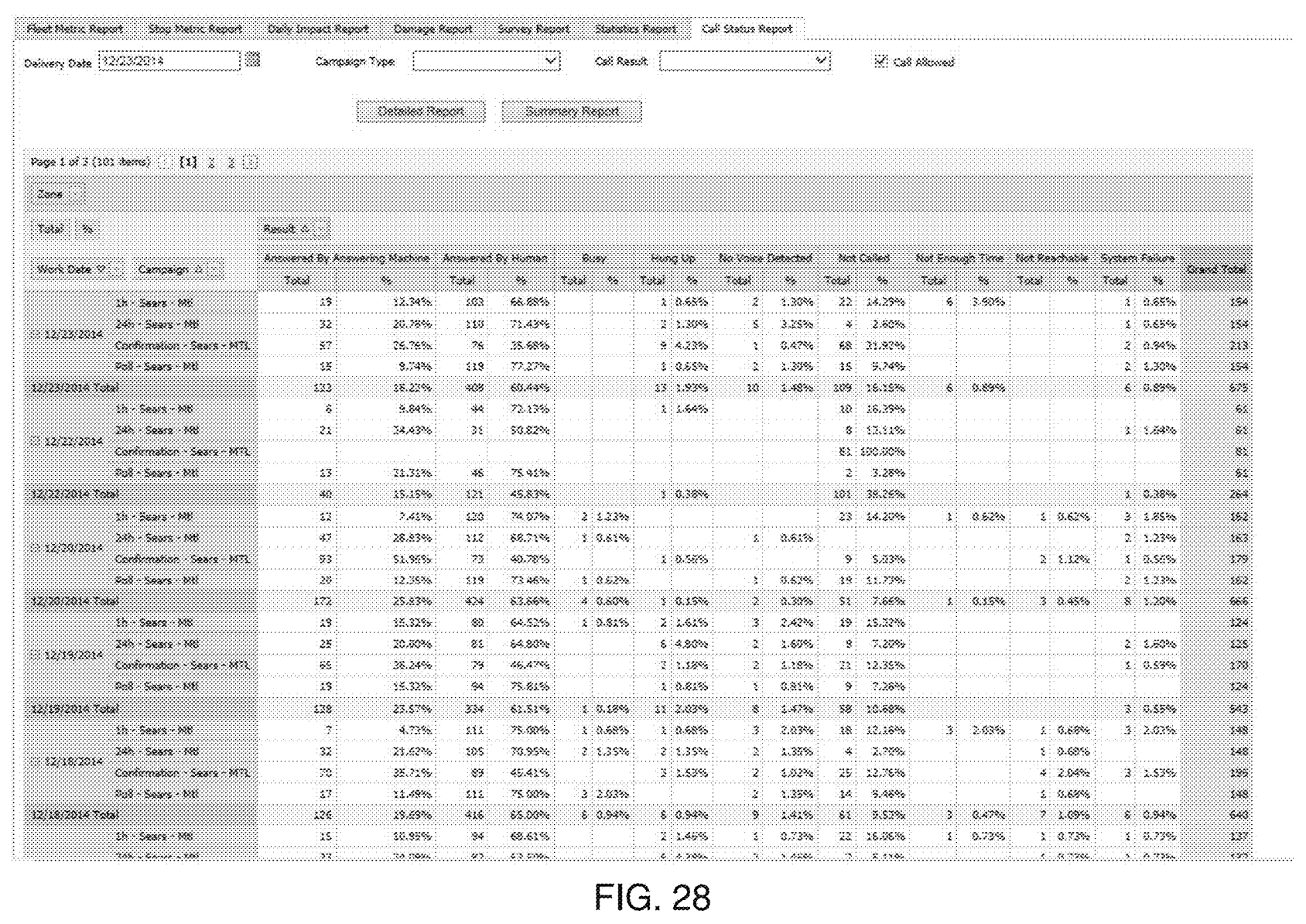
Figure 29:
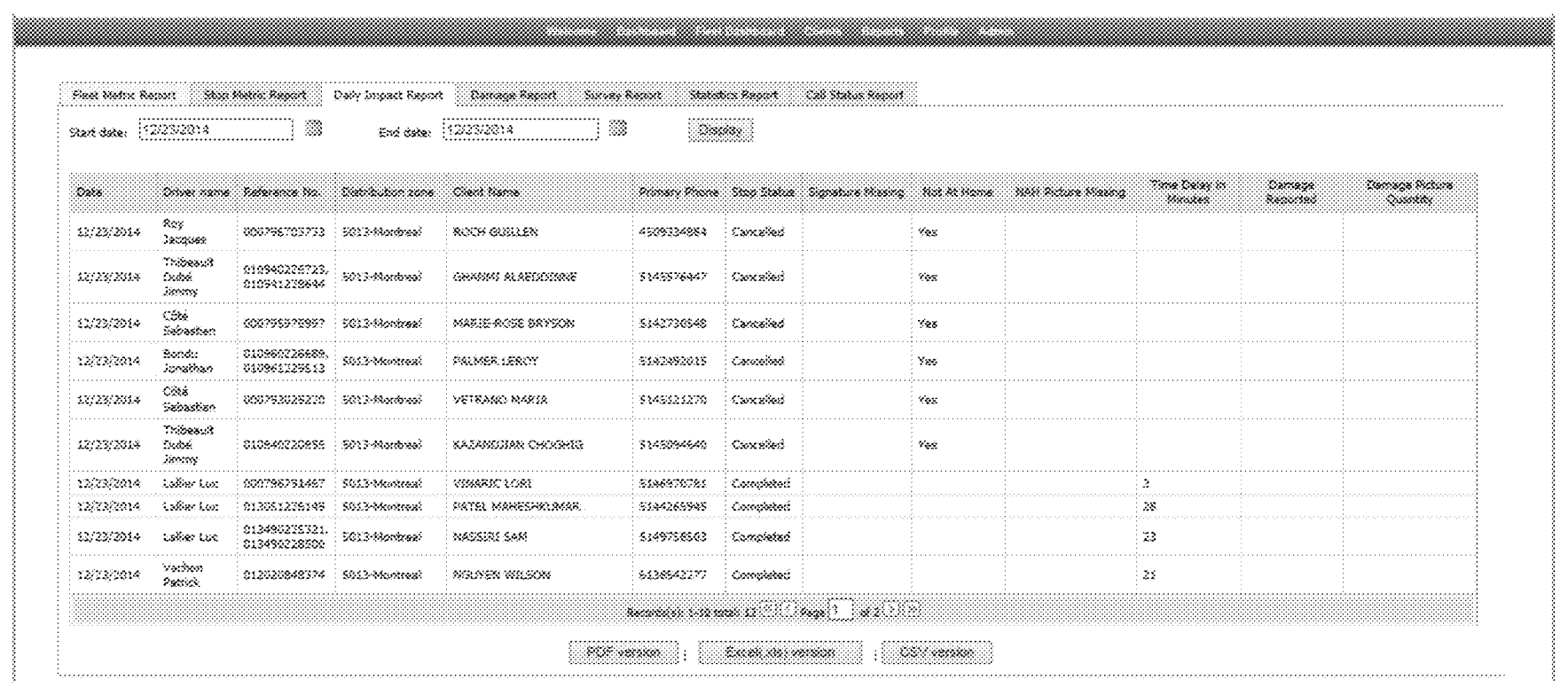
Figure 31:
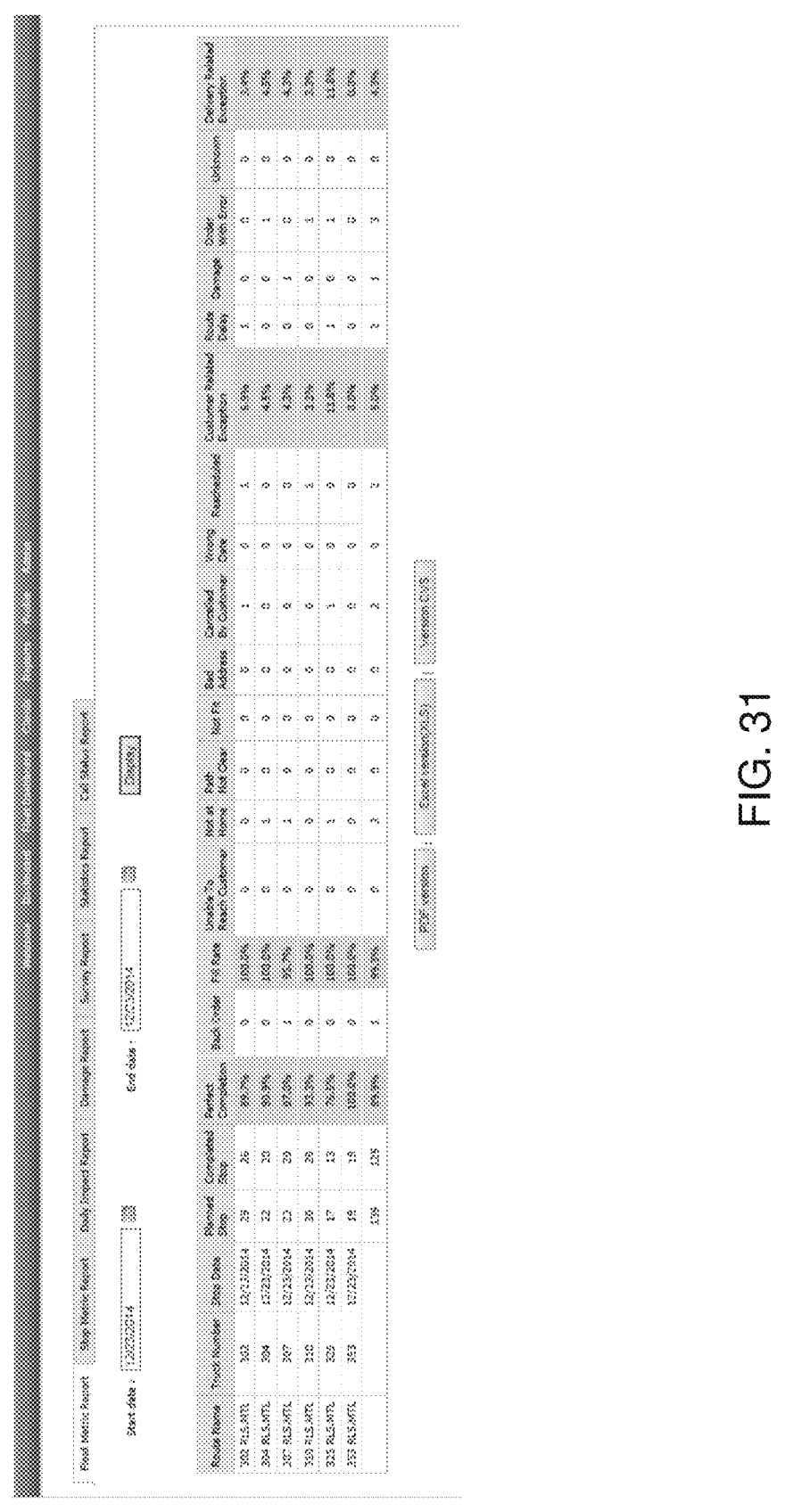
Figure 32:
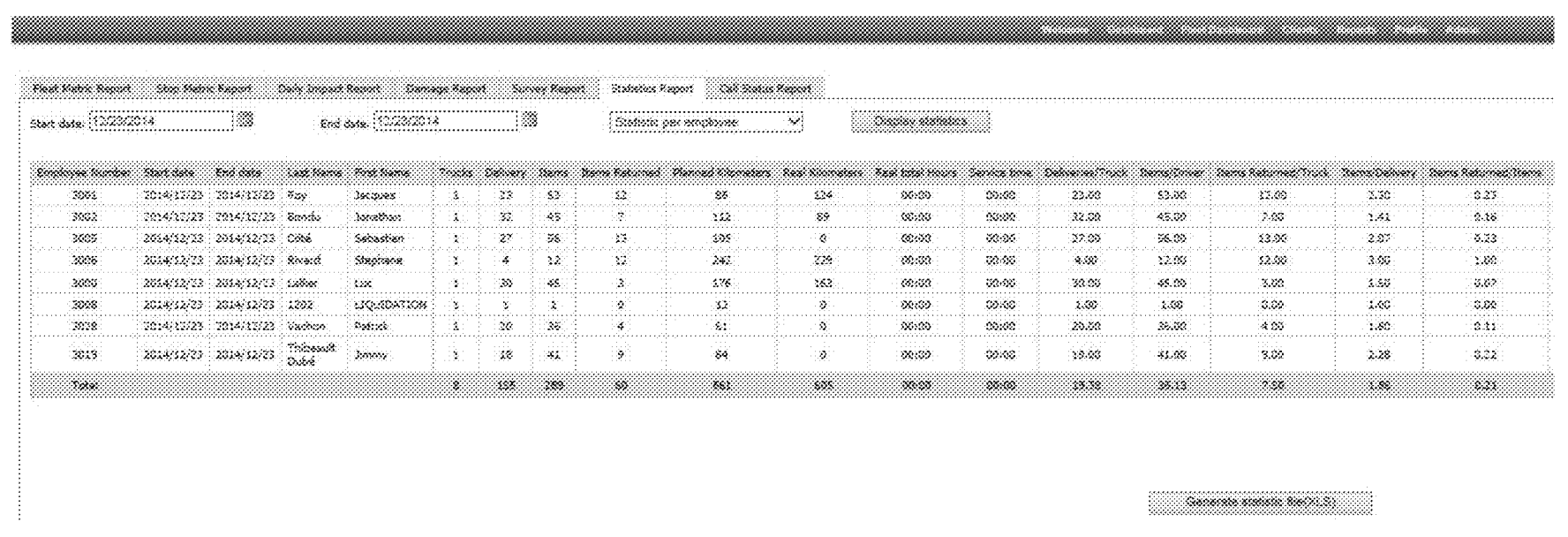
Figure 33:
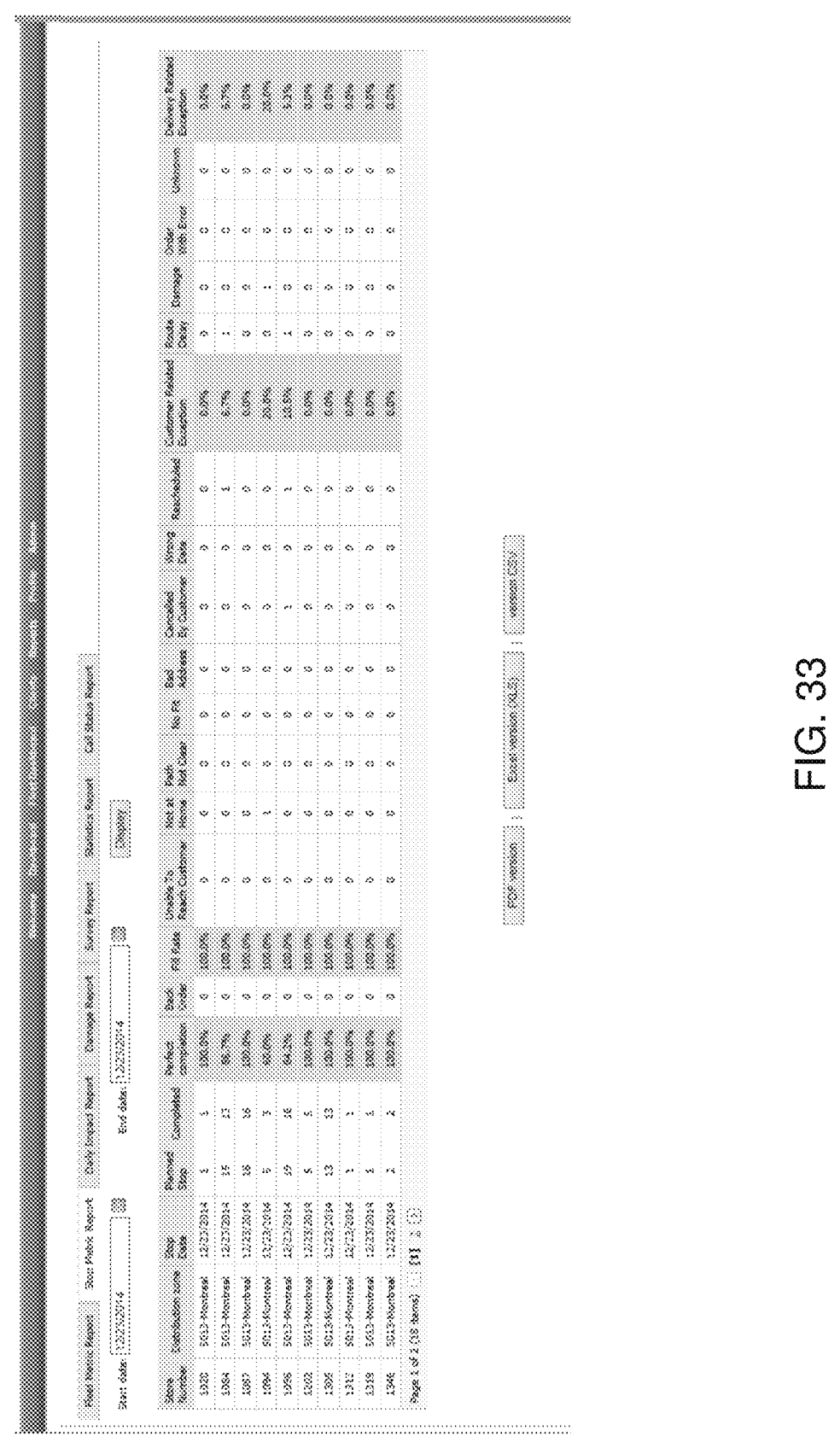

FIGS. 28 to 33 illustrate screen shots of various reports that can be generated by the system. FIG. 28 illustrates a call status report to outline the status of various calls made and the result of those calls. FIG. 29 illustrates a daily impact report to outline the status of item deliveries, e.g., to specify whether shipments were completed, canceled, etc. FIG. 30 illustrates a damage report, which can be used to itemize damaged items to determine causes and keep track of pictures taken and descriptions of the damage. FIG. 31 illustrates a fleet metric report, which itemizes the various trucks, and corresponding statistics such as planned stops, completed stops, back orders, etc. FIG. 32 illustrates a statistics report providing details of particular employees in this example. FIG. 33 illustrates a stop metric report to outline statistics regarding particular stores.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

The examples and corresponding diagrams used herein are for illustrative purposes only. Different configurations and terminology can be used without departing from the principles expressed herein. For instance, components and modules can be added, deleted, modified, or arranged with differing connections without departing from these principles.

Any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 10, any component of or related to the system 10, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method for executing a delivery, the method comprising:
   providing access to an intermediary server device via a communication network, the intermediary device being connectable to a consumer having access to a purchasing user interface via a consumer device and the network, and being connectable via the network to a plurality of carriers each having a carrier device, each carrier enabling items to be transported from pick up locations for the items to a delivery location associated with the consumer, the purchasing user interface being integrated with the intermediary server device via the network by a retailer, manufacturer or wholesaler;
   enabling, via the purchasing user interface accessed by the consumer or consumer device, the consumer to request delivery of an order comprising one or more items to the delivery location by communicating with the intermediary server device;
   determining at the intermediary server device, from the request received via the network, a delivery plan based on at least an origin of the one or more items, an availability of the one or more items, and a delivery destination;
   receiving, at the intermediary server device, via the network, real time data associated with local attributes for a geographic region associated with the delivery plan, and carrier capacity that changes over time;
   determining at the intermediary server device, an optimized delivery route for the delivery plan by:
   defining the geographic region;

defining a plurality of sub sectors within the geographic region;
refining the sub sectors according to the real time data associated with the local attributes affecting the corresponding sub sector to identify a plurality of traffic zones; and
using the refined sub sectors to map the optimized delivery route;
incorporating the optimized delivery route in the delivery plan;
the intermediary server device communicating the delivery plan to the plurality of carriers via the network to determine in response multiple available delivery time windows, provided by multiple carriers, according to at least transit time dictated by the optimized delivery route in the delivery plan, respective carrier availability, and respective carrier capacity;
the intermediary server device communicating the multiple available delivery time windows to the purchasing user interface via the network;
the intermediary server device receiving via the network from the purchasing user interface, a selection of a particular available time window;
the intermediary server device initiating the delivery based on the delivery plan, on behalf of the retailer, manufacturer or wholesaler, by communicating via the network with a selected one of the plurality of carriers corresponding to the selection;
receiving, at the intermediary server device, real time location data from the carrier device corresponding to the selected carrier;
the intermediary server device using the real time location data to refine the optimized delivery route, by rerouting the selected carrier through or away from one or more of the traffic zones in at least one of the sub sectors, according to the real time location data; and
the intermediary server device sending the refined optimized delivery route to the carrier device corresponding to the selected carrier.

2. The method of claim 1, further comprising generating an electronic delivery appointment and communicating the delivery appointment to at least one of the selected carrier and the consumer device.

3. The method of claim 1, wherein the intermediary server device facilitates matching demand from retailers with spare delivery capacity in a carrier network.

4. The method of claim 1, wherein the selection is made at a retail location, or using a personal device.

5. The method of claim 1, wherein the intermediary server device is integrated with a retailer interface using a customized front end interface.

6. The method of claim 1, wherein the transit time is determined according to inventory available at one or more vendors, and the geographic region associated with the delivery location.

7. The method of claim 1, further comprising generating delivery data for the delivery plan.

8. The method of claim 7, wherein the delivery data is standardized.

9. The method of claim 8, wherein the standardized delivery data uses a GS1 format.

10. The method of claim 8, wherein the delivery data comprises one or more of: a unique ID, an invoice number, a name, an address, a phone number, an item description or task description, and the time window.

11. The method of claim 1, further comprising receiving delivery status data from the selected carrier.

12. The method of claim 11, wherein the delivery status data comprises any one or more of: a pick up status, a delivery status, a route change, a damage notification, and a signature.

13. The method of claim 12, wherein the delivery status data comprises at least one image, the at least one image capturing either the delivery location or damage to the one or more items.

14. The method of claim 1, further comprising sending one or more notifications to any one of the consumer device, the selected carrier, and an inventory related entity.

15. The method of claim 1, further comprising updating at least one of warehouse data, billing data, and auditing data.

16. The method of claim 1, further comprising: generating at least one child subsector; and identifying for the plurality of traffic zones at least one of: a fast zone, a regular zone, and a slow zone within the at least one child subsector.

17. The method of claim 16, further comprising generating a visual mapping of the geographical region.

18. The method of claim 1, further comprising initiating an item management process for any one or more of receiving, staging and picking, and reverse logistics for returned items.

19. The method of claim 18, wherein item management for receiving comprises initiating generation of an identifier for each item included in the delivery.

20. The method of claim 18, wherein item management for staging and picking comprises facilitating unloading of a vehicle according to placement of items to be delivered by the vehicle.

21. The method of claim 18, wherein item management for reverse logistics comprises processing the returned items to identify or add unique identifiers for subsequent processing.

22. The method of claim 1, wherein the carrier availability accounts for at least one of:
available capacity within a vehicle, availability along an existing route, availability of a vehicle or vehicle operator, and available operating times.

23. A non-transitory computer readable medium comprising computer executable instructions for executing a delivery, the computer executable instructions comprising instructions for:
providing access to an intermediary server device via a communication network, the intermediary device being connectable to a consumer having access to a purchasing user interface via a consumer device and the network, and being connectable via the network to a plurality of carriers each having a carrier device, each carrier enabling items to be transported from pick up locations for the items to a delivery location associated with the consumer, the purchasing user interface being integrated with the intermediary server device via the network by a retailer, manufacturer or wholesaler;
enabling, via the purchasing user interface accessed by the consumer or consumer device, the consumer to request delivery of an order comprising one or more items to the delivery location by communicating with the intermediary server device;
determining at the intermediary server device, from the request received via the network, a delivery plan based on at least an origin of the one or more items, an availability of the one or more items, and a delivery destination;
receiving, at the intermediary server device, via the network, real time data associated with local attributes for a geographic region associated with the delivery plan and carrier capacity that changes over time;

determining at the intermediary server device, an optimized delivery route for the delivery plan by:
  defining the geographic region;
  defining a plurality of sub sectors within the geographic region;
  refining the sub sectors according to the real time data associated with the local attributes affecting the corresponding sub sector to identify a plurality of traffic zones; and
  using the refined sub sectors to map the optimized delivery route;

incorporating the optimized delivery route in the delivery plan;

the intermediary server device communicating the delivery plan to the plurality of carriers via the network to determine in response multiple available delivery time windows, provided by multiple carriers, according to at least transit time dictated by the optimized delivery route in the delivery plan, respective carrier availability, and respective carrier capacity;

the intermediary server device communicating the multiple available delivery time windows to the purchasing user interface via the network;

the intermediary server device receiving via the network from the purchasing user interface, a selection of a particular available time window;

the intermediary server device initiating the delivery based on the delivery plan, on behalf of the retailer, manufacturer or wholesaler, by communicating via the network with a selected one of the plurality of carriers corresponding to the selection;

receiving, at the intermediary server device, real time location data from the carrier device corresponding to the selected carrier;

the intermediary server device using the real time location data to refine the optimized delivery route, by rerouting the selected carrier through or away from one or more of the traffic zones in at least one of the sub sectors, according to the real time location data; and the intermediary server device sending the refined optimized delivery route to the carrier device corresponding to the selected carrier.

24. An intermediary system for executing a delivery, the system comprising a processor and memory, the memory comprising computer executable instructions for:
  providing access to an intermediary server device via a communication network, the intermediary device being connectable to a consumer having access to a purchasing user interface via a consumer device and the network, and being connectable via the network to a plurality of carriers each having a carrier device, each carrier enabling items to be transported from pick up locations for the items to a delivery location associated with the consumer, the purchasing user interface being integrated with the intermediary server device via the network by a retailer, manufacturer or wholesaler;

enabling, via the purchasing user interface accessed by the consumer or consumer device, the consumer to request delivery of an order comprising one or more items to the delivery location by communicating with the intermediary server device;

determining at the intermediary server device, from the request received via the network, a delivery plan based on at least an origin of the one or more items, an availability of the one or more items, and a delivery destination;

receiving, at the intermediary server device, via the network, real time data associated with local attributes for a geographic region associated with the delivery plan, and carrier capacity that changes over time;

determining at the intermediary server device, an optimized delivery route for the delivery plan by:
  defining the geographic region;
  defining a plurality of sub sectors within the geographic region;
  refining the sub sectors according to the real time data associated with the local attributes affecting the corresponding sub sector to identify a plurality of traffic zones; and
  using the refined sub sectors to map the optimized delivery route;

incorporating the optimized delivery route in the delivery plan;

the intermediary server device communicating the delivery plan to the plurality of carriers via the network to determine in response multiple available delivery time windows, provided by multiple carriers, according to at least transit time dictated by the optimized delivery route in the delivery plan, respective carrier availability, and respective carrier capacity;

the intermediary server device communicating the multiple available delivery time windows to the purchasing user interface via the network;

the intermediary server device receiving via the network from the purchasing user interface, a selection of a particular available time window;

the intermediary server device initiating the delivery based on the delivery plan, on behalf of the retailer, manufacturer or wholesaler, by communicating via the network with a selected one of the plurality of carriers corresponding to the selection;

receiving, at the intermediary server device, real time location data from the carrier device corresponding to the selected carrier;

the intermediary server device using the real time location data to refine the optimized delivery route, by rerouting the selected carrier through or away from one or more of the traffic zones in at least one of the sub sectors, according to the real time location data; and the intermediary server device sending the refined optimized delivery route to the carrier device corresponding to the selected carrier.

* * * * *